United States Patent [19]

Nickles

[11] Patent Number: 5,974,569
[45] Date of Patent: Oct. 26, 1999

[54] SYSTEM AND METHOD FOR DETERMINING WHETHER TIME-BASED OPERATIONS OF A COMPUTER SYSTEM OPERATE PROPERLY

[76] Inventor: Alfred E. Nickles, 5365 Chelsen Wood Dr., Duluth, Ga. 30155

[21] Appl. No.: 09/002,934

[22] Filed: Jan. 5, 1998

[51] Int. Cl.⁶ .................................................. G06F 11/00
[52] U.S. Cl. ................................ 714/38; 714/33; 714/46
[58] Field of Search ................................... 714/38, 33, 46

[56] References Cited

U.S. PATENT DOCUMENTS 5,881,222  3/1999  Berry et al. ........................ 395/184.01

OTHER PUBLICATIONS

IBM, "The Year 2000 and 2–Digit Dates: A Guide for Planning and Implementation, Third Edition", Chapters 5, 7, appendices B & C, May 1996.

Joe Chung et al; "y2k PC test script", Internet Newsgroup Forum: comp.software.year–2000; Messages 1 & 2, Apr. 1997.

Guy Dujardin et al; "Year 2000 testplan", Internet Newsgroup Forum: comp.software.year–2000; Messages 1–6, Dec. 1996.

IEEE P2000.2 "Draft Recommended Practice for Information Technology Year 2000 Test Methods"; pp. 1–111, 1998.

*Primary Examiner*—Robert W. Beausoliel, Jr.
*Assistant Examiner*—Brian H. Shaw
*Attorney, Agent, or Firm*—Morris, Manning & Martin, L.L.P.

[57] ABSTRACT

Generally, the present invention is a method for identifying whether time-based operations of a computer system operate properly for time intervals over which the computer system operates. Specifically, the present invention is operative to identify the type of failure that occurs. The present invention utilizes test programs and test procedures to determine whether the hardware, BIOS, operating system, and computer language handle time and date calculations correctly. The present invention may identify a time period to be evaluated and divide the time period into a plurality of time intervals. This process accepts a first frequency value that specifies the frequency at which time test modules are to execute the time-based operations of the computer system. A first set of time-based test modules are executed at the frequency specified by the first frequency value in a first time interval. A second frequency value may be specified and the time test modules are executed at the frequency specified by second frequency value. The time test modules may be executed for a second time interval at the frequency specified by the second frequency value.

17 Claims, 16 Drawing Sheets

| TEST INTERVAL | 1 | 2 | 3 | 4 | 5 | 6 | 7 | 8 | 9 | 10 | 11 |
|---|---|---|---|---|---|---|---|---|---|---|---|
| RESULTS | ⚠ | ⚠ | ☺ | ☺ | ☺ | ☠ | ☺ | ☺ | ☺ | ☺ | ⚠ |

(CLICK ON THE IMAGE TO SEE TEST RESULTS FOR THAT TIME PERIOD)

KEY: ☺ ALL TESTS PASSED    ⚠ SOME TESTS FAILED    ☠ MANY TESTS FAILED

| INTERVAL | START DATE | TEST FREQUENCY | ITERATIONS | FAILURES |
|---|---|---|---|---|
| 1 | 1 JAN 1970, 00:00:00 | MONTHLY | 1485 | 12 |
| 2 | 1 JAN 1975, 00:00:00 | MONTHLY | 1980 | 5 |
| 3 | 1 JAN 1980, 00:00:00 | DAILY | 19910 | 0 |
| 4 | 1 JAN 1999, 00:00:00 | HOURLY | 1320 | 0 |
| 5 | 30 DEC 1999, 00:00:00 | EACH MINUTE | 155100 | 0 |
| 6 | 31 DEC 1999, 23:00:00 | EACH SECOND | 39600 | 200 |
| 7 | 1 JAN 2000, 01:00:00 | EACH MINUTE | 155100 | 0 |
| 8 | 3 JAN 2000, 00:00:00 | HOURLY | 1320 | 0 |
| 9 | 1 JAN 2001, 00:00:00 | DAILY | 21670 | 0 |
| 10 | 1 JAN 2002, 00:00:00 | MONTHLY | 1375 | 0 |
| 11 | 1 JAN 2016, 00:00:00 | MONTHLY | 1870 | 29 |

TEST SUITE DESCRIPTIONS         RECOMMENDATION

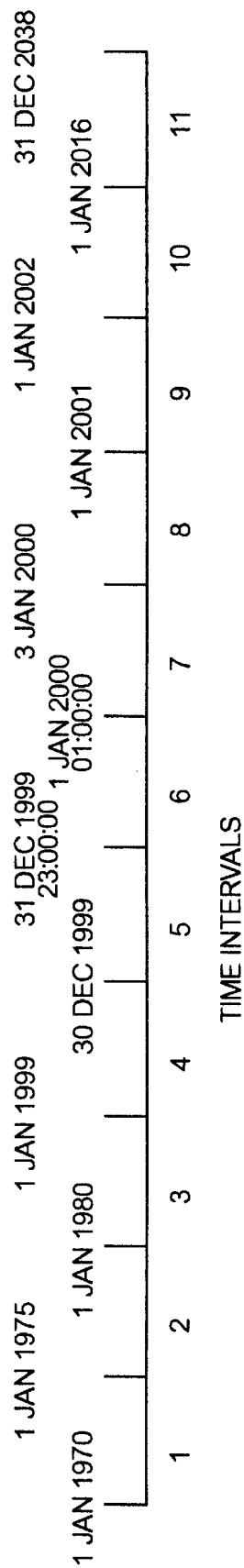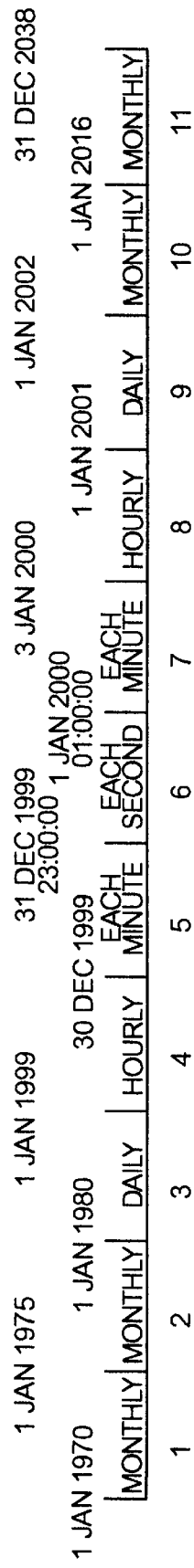

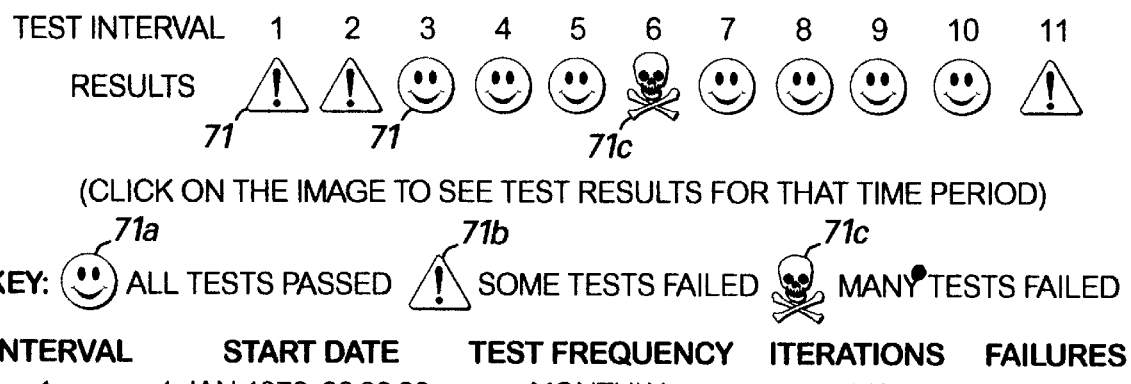

| TEST INTERVAL | 1 | 2 | 3 | 4 | 5 | 6 | 7 | 8 | 9 | 10 | 11 |
|---|---|---|---|---|---|---|---|---|---|---|---|
| RESULTS | ⚠ | ⚠ | ☺ | ☺ | ☺ | ☠ | ☺ | ☺ | ☺ | ☺ | ⚠ |

(CLICK ON THE IMAGE TO SEE TEST RESULTS FOR THAT TIME PERIOD)

KEY: ☺ ALL TESTS PASSED  ⚠ SOME TESTS FAILED  ☠ MANY TESTS FAILED

| INTERVAL | START DATE | TEST FREQUENCY | ITERATIONS | FAILURES |
|---|---|---|---|---|
| 1 | 1 JAN 1970, 00:00:00 | MONTHLY | 1485 | 12 |
| 2 | 1 JAN 1975, 00:00:00 | MONTHLY | 1980 | 5 |
| 3 | 1 JAN 1980, 00:00:00 | DAILY | 19910 | 0 |
| 4 | 1 JAN 1999, 00:00:00 | HOURLY | 1320 | 0 |
| 5 | 30 DEC 1999, 00:00:00 | EACH MINUTE | 155100 | 0 |
| 6 | 31 DEC 1999, 23:00:00 | EACH SECOND | 39600 | 200 |
| 7 | 1 JAN 2000, 01:00:00 | EACH MINUTE | 155100 | 0 |
| 8 | 3 JAN 2000, 00:00:00 | HOURLY | 1320 | 0 |
| 9 | 1 JAN 2001, 00:00:00 | DAILY | 21670 | 0 |
| 10 | 1 JAN 2002, 00:00:00 | MONTHLY | 1375 | 0 |
| 11 | 1 JAN 2016, 00:00:00 | MONTHLY | 1870 | 29 |

📄 TEST SUITE DESCRIPTIONS    📝 RECOMMENDATION

FIG. 5

| TEST SUITES | ITERATIONS | FAILURES FAILURE CODE COMPONENT | | | | |
|---|---|---|---|---|---|---|
| | | 02 | 03 | 04 | 05 | 06 |
| TEST SUITE 1: GET/SET TIME & DATE | 27 | 0 | 0 | 0 | - | - |
| TEST SUITE 2: TIME & DATE (DOS) FORMAT | 27 | 0 | 0 | 0 | 0 | - |
| TEST SUITE 3: TIME & DATE (CUT/GMT FORMATS) | 27 | 0 | 0 | - | - | - |
| TEST SUITE 4: TIME & DATE LOCAL (TIME ZONES) | 27 | 0 | 0 | 0 | 0 | 0 |
| TEST SUITE 5: TIME ZONE & DAYLIGHT SAVINGS PARAMETERS | 27 | 0 | 0 | 0 | - | - |
| TEST SUITE 6: TIME & DATE LOCAL (DST) | 27 | 12 | 0 | 0 | - | - |
| TEST SUITE 7: OPERATING SYSTEM TIME PROCESSES | 27 | 0 | 0 | - | - | - |
| TEST SUITE 8: | 27 | 0 | 0 | - | - | - |

FIG. 6

TEST SUITE 1: LOCAL TIME

TEST SUITE 2: LOCAL TIME

TEST SUITE 4: LOCAL TIME

TEST SUITE 7: SLEEP

SYSTEM AND METHOD FOR DETERMINING WHETHER TIME-BASED OPERATIONS OF A COMPUTER SYSTEM OPERATE PROPERLY

FIELD OF THE INVENTION

The present invention relates generally to a method that determines whether a computer system operates properly, and more particularly, relates to a method that determines whether time-based operations in a computer system operate properly.

BACKGROUND OF THE INVENTION

Since the advent of the computer system, computer programming bugs have plagued application programs and operating systems. Often when a new program is introduced into the market, during the initial months of use various features are discovered not to function properly. Although computer programmers make efforts to minimize programming bugs, the marketplace has come to expect that the introduction of a new computer application or system will have programming bugs that will have to be fixed. Typically these type bugs will cause a temporary crash in the system which can be corrected without a substantial loss of data.

Although most programming problems arise unexpectedly and can be corrected with ease or moderate expense, one of the largest and most expensive computer programming problems is on the horizon. The programming problem is not typical in that it was not unforeseen but was ignored as something that would be addressed in the future. Now that the future is here, the enormity of the problem is being realized. The problem arises from the common place programming practice that uses and calculates dates based only on the last two digits of the year date rather than including all digits of the date. This problem is most often referred to as the Year 2000 Problem or Millennium Bug. The Year 2000 Problem will cause a computer program to miscalculate dates or return erroneous data when the internal clock on the computer transitions from the year 1999 to the year 2000.

The Year 2000 Problem has been considered by many to exist mainly in mainframe computer systems that were programmed in the COBOL language many years ago when memory space in computer systems was very limited. Computer programmers in an effort to streamline the amount of data that was stored or manipulated in a computer program, wrote efficient code that stored dates using the least amount of memory space in the computer system. Rather than programming dates in the computer system using the entire representation of the date, such as Dec. 7, 1996, programmers used a six-digit representation of a date such as 120796. Because many aspects of computer programs operate based on the adding, subtracting or manipulating dates from various fields, when the year 2000 is reached as determined by the clock in the computer system, the two-digit representation of the year will transition to "1900", "1970" or other dates that may serve as a beginning point for time in the computer. When this transition occurs many computer systems will shut down or provide erroneous data when calculations are made based upon the incorrect date.

The primary customers or individuals who are concerned with the Year 2000 Problem are institutional customers that have invested millions of dollars in mainframe computer systems that require special programming expertise to solve the Year 2000 Problem. Although the year 2000 problem is often thought to primarily exist in mainframe computer systems, the Year 2000 programming Problem also exists for many personal computers ("PC's"). These large institutional customers have many PC's that are connected to mainframe computer systems or that are simply interfaced through a network server. Thus, PC's could be affected in two (2) ways. First, PC's can be adversely affected by the Year 2000 programming problem if the mainframe to which the PC is connected crashes. Second, a programming problem may exist in any of one of numerous components of the PC in which dates have been abbreviated for programming. These institutional companies that have invested millions of dollars in computer systems are, for example, the National Defense Department of the United States, banking and financial institutions, and medical institutions.

The most immediate way of handling the Year 2000 Problem may be to replace current computer systems with computer systems that do not contain this bug. However, most companies have invested substantial sums of money into their system and an entire overhaul of the computer system would be extraordinarily expensive. Even with PC's, for a large organization, replacing each PC with computers believed to have Year 2000 enabled solutions is not economically practical. Furthermore, there is not a guarantee that the replacement systems will solve the problem.

In reality, millions of computers installed today will still be in use in the year 2000. Many will be running today's operating systems and applications built with today's computer language. Even if these general operating systems or applications are replaced, plug-in compatible hardware and software will still exist in the marketplace. Plug-in compatibles as well as many PC's are built by different manufacturers. Manufacturers of PC's, as well as manufacturers of plug-in compatibles, buy timer chips, firmware, the basic input/output system ("BIOS") and applications from various manufacturers and companies. The computer equipment manufacturers typically purchase compatible chips and BIOS from the lowest cost provider at the time of manufacturing the equipment. Given the various manufacturers of computer components, no one can be sure what aspects of the chips, firmware, BIOS or applications work properly with the operating system or with a specific computer language.

With regard to the horrors that the Year 2000 Problem may present, it has been stated that 15 to 20% of businesses worldwide may cease to exist. A consensus believes that virtually every business worldwide will be effected in some fashion. Some figures indicate that 75% of businesses worldwide will spend a large sum approaching 5 years worth of profits, which will not produce a return on investment. Some may believe that the problem is over exaggerated. However, many of the predictions are real and will have a significant impact on a business if the business executives refuse to recognize the significance and magnitude of the problem. Those companies that believe that the problem will not happen to them will procrastinate until it is too late and will likely suffer some loss. Virtually every business relies on computers for payroll, billing, insurance, sales, order processing, accounting, inventory, or process control. It does not matter whether the computers are mainframes, minicomputers, or personal computers—the Year 2000 Problem exists and needs to be addressed.

While many people recognize that applications and general operating systems of PC's will be effected, there has not been full recognition of the significance of the problem in a PC. There are various levels of the PC system which may cause a time-based failure which have not been fully addressed in a PC. Particularly, six levels should be addressed: (1) the application level; (2) the sub-system level; (3) the language level; (4) the operating system level; (5) BIOS level; and (6) the hardware level. These six levels of functions in the computer system are significant because they typically represent multiple vendors. Because various manufacturers provide pieces of the system, this makes tracking the problem difficult and gives rise to the problem of identifying the particular vendor or manufacturer that contributed to or caused the problem.

As noted previously, it is not practical to replace an entire inventory of computer systems. Unnecessarily replacing a PC would cost in today's market from $2500 to $4500 per system. Therefore, there is a need in the art which provides a solution that enables the Year 2000 Problem to be addressed economically in a PC system and that isolates Year 2000 problems in a PC to one of the six specific levels so that the identified level can be corrected or avoided during use of the system.

SUMMARY OF THE INVENTION

Generally, the present invention is a method for identifying whether time-based operations of a computer system operate properly for time intervals over which the computer system operates. Specifically, the present invention is operative to identify the type of failure that occurs. The present invention utilizes test programs and test procedures to determine whether the hardware, BIOS, operating system, and computer language handle time and date calculations and manipulations correctly.

More particularly, in a computer system that has a plurality of computer program modules that perform time-based operations, a method operating according to the present invention selects a first group of the computer program modules to implement time-based operations on the computer system. The first group is selected to test a first set of related time-based operations within the computer system. The process then executes the first group of program modules for each of a plurality of first preselected time values and determines whether execution of the first group of program modules for the first set of time values indicated that at least one of the functions executed by one of the program modules yielded an incorrect time calculation.

The process of this embodiment may also include the step of executing the first group for a second set of predetermined time values and determining whether execution of the second group of program modules for the second set of time values indicated that at least one of the functions executed by one of the program modules yielded an incorrect time calculation. Preferably, the first set of predetermined time values represent smaller units of time than the second set of time values. For example, the first set of predetermined time values may represent seconds and the second set of predetermined time values may represent minutes, hours, days, months, or years. The method of the present invention is preferably implemented in a personal computer system where at least some of the time modules are selected from the group time, ctime, asctime, localtime, gmtime, or mktime modules. These modules are typically provided for time operations in a personal computer system that is compatible with an IBM compatible PC.

Another embodiment of the present invention determines whether time operations within a computer system function properly by identifying a time period to be evaluated and dividing the time period into a plurality of time intervals. This embodiment accepts a first frequency value that specifies the frequency at which time test modules are to execute the time-based operations of the computer system. A first set of time-based test modules are executed at the frequency specified by the first frequency value in a first time interval.

This embodiment may accept a second frequency value and execute the time test modules at the frequency specified by second frequency value. This method may execute the time test modules at the frequency specified by the second frequency value in a second time interval.

Another method of the present invention reports the results of a test procedure that determines when time-based operations of a computer system fail. In this method, the number of failures are determined and a plurality of time intervals over which the failures occurred are identified. A first symbol indicative of a first number of failures is associated with the time interval in which the first number of failures occurred and a second symbol indicative of a second number of failures is associated with a time interval in which the second number of failures occurred. Preferably, the first number is specified by a range of values from one to a first upper limit. The second number may be specified by a range of values that exceed the first upper limit.

Another method of the present invention identifies time-based failures and associated error codes in a convenient and easily readable manner/format. The method implements the following steps. A first group of test procedures determine whether a first set of time based operations within the computer system execute without failure. A second group of test procedures determine whether a second set of time-based operations within the computer system execute without failure. A first number is associated with the first group of test procedures and a second number is associated with the second group of test procedures. A set of failure code components are associated with the number of failures identified by the first and second test procedures. The number of failures for the first group of test procedures are displayed in association with the first number and selected ones of the failure code components. The association of the first number and a selected one of the failure code components uniquely identify the failure code that defines the type of failure detected. The number of failures for the second group of test procedures are displayed in association with the second number and selected ones of the failure code components. The association of the second number and a selected one of the failure code components uniquely identify the failure code that defines the type of failure detected.

Thus, it is an object of the present invention to provide a computer system that identifies problems in the time-based operations of a computer system.

It is another object of the present invention to provide a method for presenting the failure data detected by the system in a systematic and easily understood format.

BRIEF DESCRIPTION OF THE DRAWINGS

The accompanying drawings, which are incorporated and constitute a part of the specification, illustrate preferred and alternative embodiments of the present invention and, together with a general description given above and the detailed description of the embodiments given below, serve to explain the principles of the present invention.

FIG. 4a is diagram of the time period of operation of a computer system divided into time intervals that are used for the test process of the present invention.

FIG. 4b is a diagram of a date and its individual components that are used to specify the frequency at which test modules are executed according to the preferred embodiment of the present invention.

FIG. 4c is a diagram of the intervals of the time period of FIG. 4a associated with a test frequency parameter of the preferred embodiment of the present invention.

FIG. 5 is a diagram of a test result presentation format and method implemented according to the preferred embodiment of the present invention.

FIG. 6 is a diagram of a failure specifications as presented according to the method and system of the present invention.

DETAILED DESCRIPTION OF THE INVENTION

Figure 1:
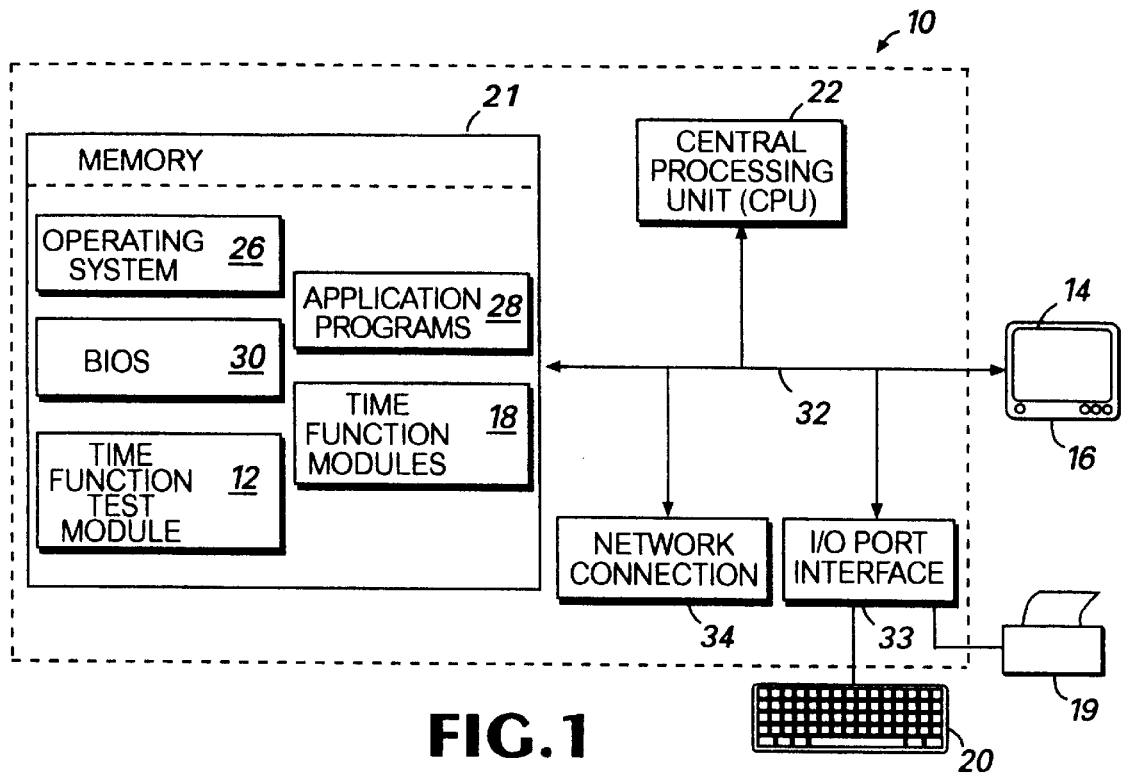
FIG. 1 is a diagram of a computer system that implements the time function test processes of the present invention.

Referring now to the drawings, FIG. 1 illustrates the basic components of a computer system that are evaluated to determine whether the computer system time functions operate properly. Generally, the system 10 of the present invention utilizes test programs and test procedures to determine whether the hardware, BIOS, operating system, and computer programs handle time and date calculations correctly. In the embodiment described herein, the time period tested is from Jan. 1, 1970 00:00:00 to Dec. 31, 2038 23:59:59. Tests past the year 2038 are not required by today's 32-bit computers because the counters used to record time are 32-bit counters and overflow in 2038. Therefore, 32-bit machines are known to fail after this date.

FIG. 1 illustrates a computer system 10 that has stored thereon a time function test module 12 that operates according to the principles of the present invention. The time function test module 12 manipulates time functions and operations within the computer system 10 in a manner that enables the computer system's time-based functions to be tested as desired. Time function modules 18 are typically defined by standards organizations as discussed below. These time functions are executed in a particular manner by the time function test module 12. The computer system 10 has a graphical user interface 14 which is displayed on monitor 16 of the computer system 10. The graphical user interface 14 is utilized to display the results of the testing procedures implemented by the system of the present invention. The results of the testing procedure can be printed on printer 19. The computer system 10 receives input data from a conventional keyboard 20, a mouse, track ball or other pointing device that may be used to input data to the computer system. A system operating according to the principles of the present invention is advantageous because the system enables a computer user or owner to identify and isolate specific components of the computer system that do not perform time and date calculations correctly. By identifing these components, a user may replace a faulty component that is identified or avoid applications or functions within an application which utilize those components. Thereby, a user may most efficiently utilize the user's current computer system with minimal changes or cost.

Although the present invention is described in conjunction with a conventional desktop computer, it will be appreciated by these skilled in the art that the present invention may be utilized in other types of computer systems. For simplicity of the drawings, many components of a standard computer system have not been illustrated, such as address buffers, memory buffers and other standard control circuits because these elements are well known and illustrated in the prior art. Description and details of these components are not necessary for the understanding of the present invention. A computer program used to implement the various steps of the present invention is generally located in the memory unit 21 and the processes of the present invention are carried out through the use of a central processing unit 22. Those skilled in the art will appreciate that the memory unit 21 is representative of both read-only Memory and Random Access Memory. The CPU 22 is typically implemented as a single-chip microprocessor, such as a Pentium processor or Pentium 2 processor, available from Intel Corporation, Santa Clara, Calif. The CPU 22 in combination with the computer software, such as an operating system 26 and application programs 28, controls the operations of the computer system. Firmware such as a basic input/output system ("BIOS") 30 provides device level control or support services for the major input/output devices in the computer system 10. The BIOS program accepts requests from application programs within the computer systems and performs input/output services requested by computer programs and provides commands to hardware devices attached as part of the computer system. The BIOS programs are generally invoked through software.

The operating system 26, in conjunction with the BIOS 30 and application programs 28, controls the allocation and usage of hardware and software resources such as memory, CPU time, disk space, and peripheral devices. It should be appreciated that many operating systems exist such as Microsoft WINDOWS and NT and IBM OS/2 that may be utilized in connection with the present invention. The bus 32 supports communications of control, address, and data signals between the CPU 22 and the remaining components of the computer system 10. The memory unit 21 and the CPU 22 are connected by the system bus 32 which provides an electrical interface between computer system components. The computer system may communicate with external components through I/O port interface 33. Computer system 10 may also be connected to a network or other computers via the network connection 34. The processes implemented by the CPU 22 may be communicated as the electrical signals along the bus 32 to an input/output device 26, such as the display monitor 14. The display monitor 14 provides a visual display of computer generated graphics and text originating from the processes implemented by a CPU 22.

In this detailed description, numerous details are provided such as computer display system elements, object definitions, display formats, sample data, etc., in order to provide an understanding of the invention. However, those skilled in the art will understand that the present invention may be practiced without these specific details. Well-known circuits, processes, methodologies, and structures are utilized in the present invention but are not described in detail in order not to obscure the present invention.

Figure 2:
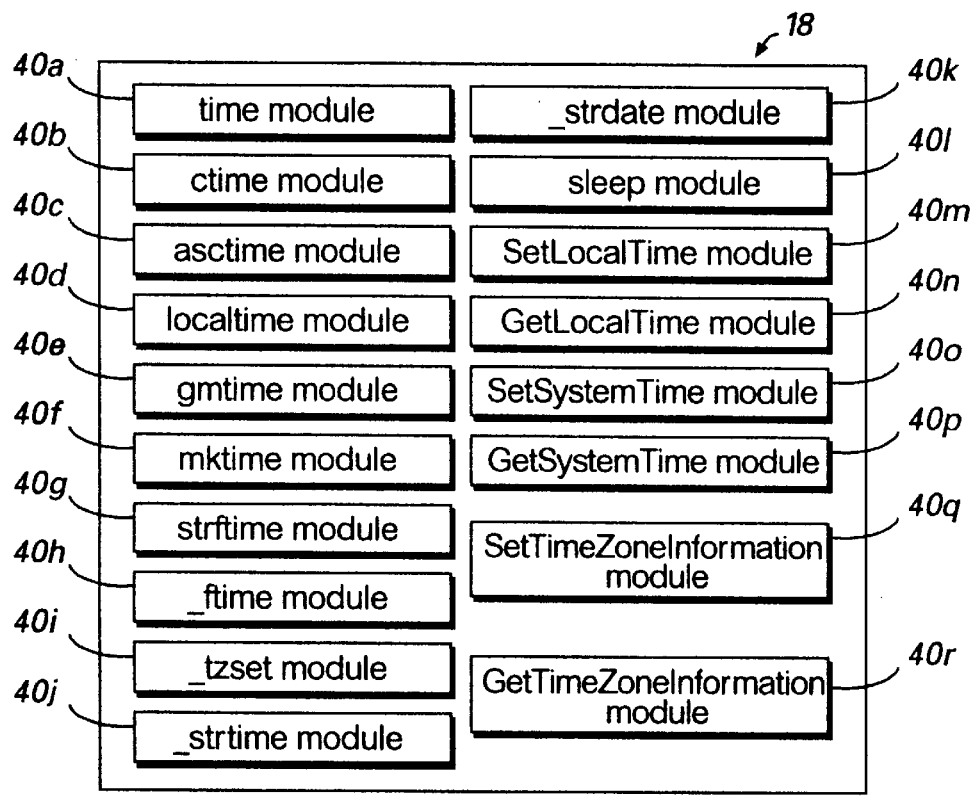
FIG. 2 is a diagram of time function modules provided in personal computer systems.

Referring to FIG. 2, the standard operating system interfaces 40 are generally referred to herein as time functions modules. These standard operating system time interfaces are typically defined by several standards organization such as American National Standard for Information Systems (ANSI), Systems Application Architecture (SAA), IEEE Standard 1003-1-1988 Portable Operating System Interface for Computer Environments (POSIX), Specification 1170 (SPEC 1170) and X/Open's Portability Guide Issue 4 Q(PG4). The time functions 40a, 40b, 40c, 40d, 40e, 40f, 40g, 40h, 40i, 40j, 40k, 40l, 40m, 40n, 40o, 40p, 40q, and 40r are representative of the standard time functions: time, ctime, asctime, localtime, gmtime, mktime, strftime, _ftime _tzset, _strtime, _strdate, sleep, SetLocalTime, GetLocalTime, SetSystemTime, GetSystemTime, SetTimeZoneInformation, and GetTimeZoneInformation, respectively. Time functions 40a–40g are defined by the standards organization. Time functions 40h–40r are typically vendor defined time functions. The actual syntax of the functions may vary by vendor. For example, Microsoft calls the function which sets the system time "SetSystemTime" for NT and Windows 95. IBM calls this function "DosGetDateTime" for OS/2. As noted above, a process or system operating according to the principles of the present invention determines whether time functions related to the operating system, BIOS, hardware and computer languages are operating properly. The preferred embodiment of the present invention executes each of the standard time functions defined for a given computer system.

Figure 3:
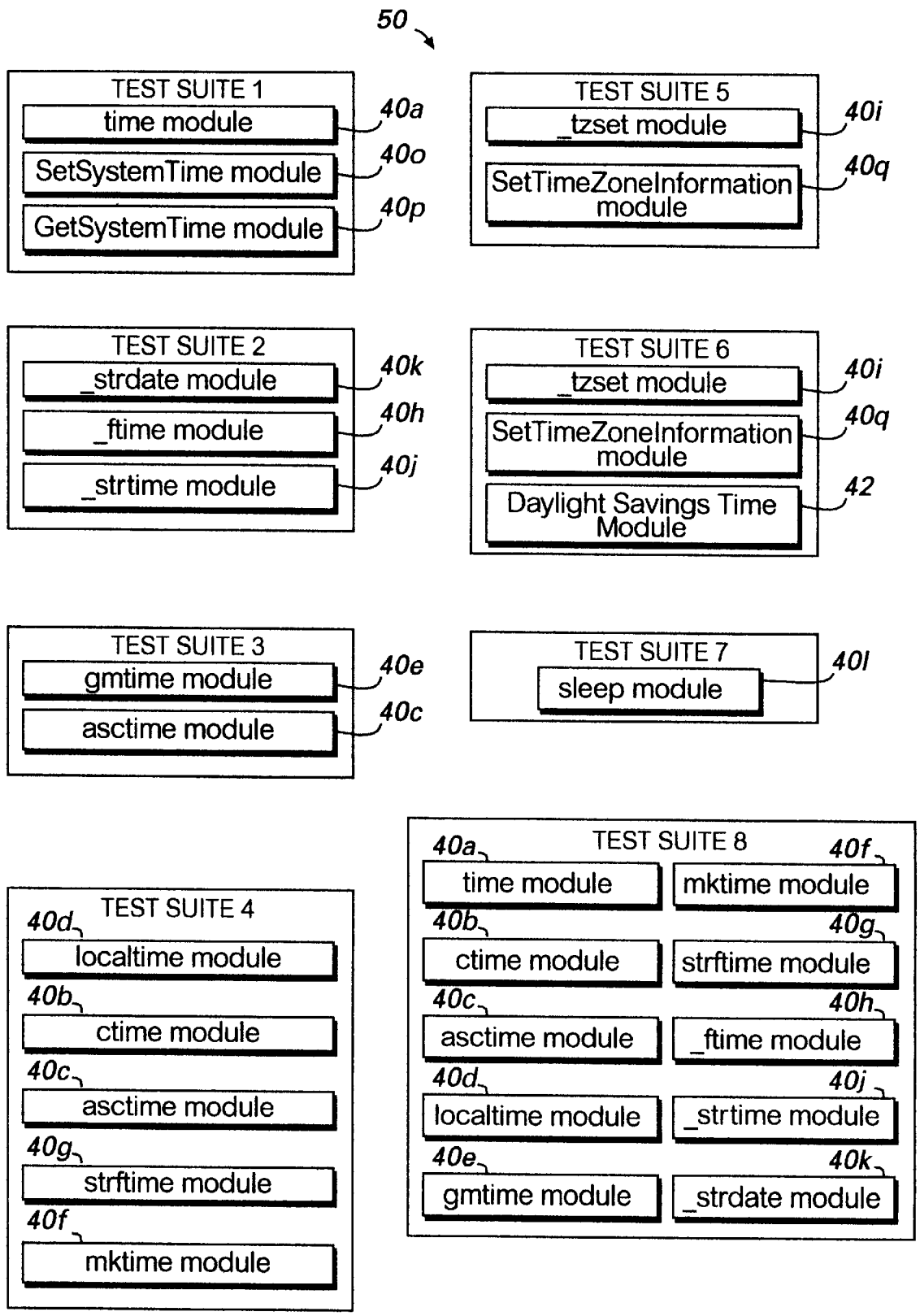
FIG. 3 is a diagram of the time function modules as grouped for execution in the preferred embodiment of the present invention.

Referring to FIG. 3, the manner in which time functions 18 are utilized in the system of the present invention are discussed. The tests of the present invention for these various components of the computer system are accomplished by organizing the time functions into test groups or test suites 50. FIG. 3 illustrates the grouping of the time functions by suites. This grouping represents the logical grouping as executed by the time function test module 12. Test suite 1 executes time functions 40a, 40o and 40p. Test suite 2 executes time functions 40h, 40j, and 40k. Test suite 3 executes time functions 40c and 40e. Test suite 4 executes time functions 40b, 40c, 40d, 40g and 40f. Test suite 5 executes time functions 40i and 40q. Test suite 6 executes time functions 40j and 40q as well as executing a daylight standard time check 42. Test suite 7 executes time function 40l. Test suite 8 executes time functions 40a, 40b, 40c, 40d, 40e, 40f, 40g, 40h, 40j and 40k. The time functions are grouped based upon the related nature of the standard time functions available for a computer system.

Test suite 1 is generally termed the "getset time and date calculations." Test suite 1 exercises the get and set time routines provided by operating system vendors. The get and set routines are considered to be "extensions" to the standards. Test suite 1 calls the SetSystemTime module and the GetSystemTime module for Windows NT and Windows 95. The time module 40a is also tested. The time functions tested in test suite 1 are BIOS related.

Test suite 2 is generally referred to as "time and date calculations for DOS formats". Test suite 2 executes the time routines that perform time and date manipulations using what is referred to by those skilled in the art as the "DOS formats" (i.e. Thu. May 16:08:17 1995). The routines exercised by test suite 2 are routines provided by an operating system vendor and are considered to be extensions to the standards. Test suite 2 exercises the _strftime module 40j, _strdate module 40k, and _ftime module 40h. Each of these tests in suite 2 are BIOS related.

Test suite 3 is referred to as "time and data calculations for CUTGMT formats". Test suite 3 executes the gmtime and asctime modules 40e and 40c. The gmtime module 40e retrieves the time in coordinated universal time (CUT) and populates a data structure whose content is defined by the standards organizations. The asctime module 40c formats these values into a data stream which must match a specific pattern as defined by the standards. The group of functions calls for test suite 3 are BIOS-independent.

Test suite 4 is generally termed "time and date calculations local" that are corrected for time zones. Test suite 4 executes routines intended to perform time and date manipulations using "local" time. Local time is CUT time corrected for time zone variations. The modules executed by test suite 4 are local time module 40d, mktime module 40f, ctime module 40b, asctime module 40c, and strftime module 40g. The test functions of test suite 4 are BIOS-independent.

Test suite 5 is generally referred to as setting time zone, with daylight saving time off, test suite. Test suite 5 executes the _tzset module 40i call (OS2) or SetTimeZoneInformation module 40q (NT and Windows 95). Test suite 5 also validates the offset made to the CUT for time zones. Including GMT, there are 25 possible variations for each data point tested. The _tzset module 40i call is considered to be an extension to the ANSI, POSIX, and SAA standards. SetTimeZoneInformation module 40q is unique to Windows NT and Windows 95. Test suite 5 is BIOS-independent.

Test suite 6 is referred to as "time and date calculations with daylight savings time on". Test suite 6 performs the same function as test suite 5, but additionally validates that the operating system compensates for daylight savings time. Test suite 6 is BIOS-independent.

Test suite 7 is generally referred to as "time related operating system process control routines". Test suite 7 determines whether the operating system properly handles the sleep module 40l call correctly. The sleep module 40l call is an approximate measure, since the accuracy of timer routines depend on many variables, including clock resolution, cycle speed and system performance. Test suite 7 is BIOS-independent.

Test Suite 8 is generally referred to as "auto rollover". Test suite 8 tests for a real time clock failure. This test determines whether the real time clock and BIOS time functions transitioned to the year 2000 correctly.

By grouping the test suites as discussed herein, managing and testing operations in the computer system can be handled more efficiently. Also, reporting these testing operations are more easily accomplished by grouping the test functions as discussed above.

While the general operation of a computer system accesses the system clock for the current time and date to generate certain dates in the computer system, the computer systems operations will occur on many dates in the future and will perform calculations with respect to past dates. To test the time related functions of the computer system thoroughly, the time function test module changes the current date of operation to different selected dates to provide an assessment of the computer systems time operations. Referring to FIG. 4a, a time line is shown that illustrates the period 1970 to 2038, for which the time function test module 12 checks for correct time functions and dates in the computer system. Typically, consumers or computer users only assume that problems due to the Millennium bug will appear only around year 2000. However, time and date errors that may cause a computer to crash or fail may happen prior to or well beyond the year 2000. Testing for all potential time error calculations over the span from 1970 to the year 2038 is a substantial task. Testing for each possible time calculation error involves many thousands of calculations. The magnitude of time required for testing for each possible error is significant. In order to validate that one single, personal computer running Windows '95 performs time and date calculations accurately at the operating system level, hardware level, BIOS level and computer language level with one second degree of accuracy from Jan. 1, 1999 to midnight Dec. 31, 2000, it would take require over 1,000,000,000 separate tests to check every possible data point. Executing every test suite function, running on a 150 MHZ machine require approximately a thousand hours per time zone. There are currently twenty-five time zones in existence.

Testing all possible data points between Jan. 1, 1970 and Dec. 31, 2038 will require approximately 35,000 hours. Therefore, it is easily seen that testing a computer for time based operations accuracy is substantial. The system of the present invention includes a method by which a computer system may be tested for time-based operation accuracy to the extent desired by a computer owner or user. The method by which the system of the present invention tests for accuracy is to divide the time period for which the computer is defined to operate into a plurality of time intervals. The length of the time intervals may vary according to a user's specification. For example, in FIG. 4a, the time period from 1970 to 2038 is divided into eleven time intervals. The first interval is from Jan. 1, 1970 to Jan. 1, 1975. The second time interval is from Jan. 1, 1975 to Jan. 1, 1980. The third time interval is identified from Jan. 1, 1980 to Jan. 1, 1999. The fourth time interval is from Jan. 1, 1999 to Dec. 30, 1999. The fifth time interval is identified from Dec. 30, 1999 to Dec. 31, 1999, 23:00:00. A sixth time interval is identified from Dec. 31, 1999 23:00:00 to Jan. 1, 2000, 01:00:00. The seventh time interval is from Jan. 1, 2000, 01:00:00 to Jan. 3, 2000, 00:00:00. The eight time interval is identified from Jan. 3, 2000 to Jan. 1, 2001. The ninth time interval is identified from Jan. 1, 2001 to Jan. 1, 2002. The tenth time interval is identified from Jan. 1, 2002 to Jan. 1, 2016. The eleventh time interval is identified from Jan. 1, 2016 to Dec. 31, 2038.

By dividing the time period over which the computer system operates into time intervals, the computer system may be selectively tested by the test suites. Particularly, the frequency at which a time interval is to be tested may be specified as by year, month, day, hour, minute, or second.

Referring to FIG. 4b, the general use of the terminology "accuracy" and "frequency" is discussed. As known to those skilled in the art, time and date calculation can be specified down to the second or can be specified by a larger time unit, such as a year. The date 80 shown in FIG. 4b has various elements. Elements 81, 82, 83, 85, 86, and 84 represent time elements specified by seconds, minutes, hours, days, months, and years, respectively. If a date or time is given with the seconds element 81 specified, the test is performed for every second within the period specified. If a date or time is given with the months element 86 specified as the smallest interval of time, the test is performed for every month within the period specified. Therefore, when the system of the present invention tests for "frequency" at a specific level, the time element for the specified frequency is varied for each unit of the element along with each time element that represents a greater unit of time. For example, if seconds frequency is specified, the seconds element is varied for each test for each minute, each hour, each day, each month, and each year for the time interval. If "day" frequency is specified, each day element is tested for each test for each month and each year. Specifying the frequency by year, month, day, hour, minute, or second identifies the frequency by which the test suites are run for a given interval. FIG. 4c illustrates the various frequency levels at which tests are executed at the various time intervals for the time period illustrated. By enabling a user to specify the frequency with which various time intervals over the operation period of the computer may be tested, the user can determine: (1) the length of time that the test will run; (2) the reliability of time function operations; and (3) the reliability of time function operations for the overall computer system for specific interval. The higher the frequency rate specified for each time interval, the more reliable the overall test for the computer system will be. However, with a high degree of frequency specified for each of the intervals, the tests can run longer than a practical situation would require.

In operation, the test suites are executed with the specified frequency for each time interval in successive order beginning at the earliest date with which the computer system is designed to operate. All tests are validated with the "to-the-second" level of accuracy. As the test suites execute over the time intervals specified, the computer system tracks the number of interactions performed during the time interval and the number of failures that occurred during each time interval.

When the computer finishes executing each of the test suites as identified by a system operating according to the present invention, the graphical user interface displays the results of the test in an easy to read and use format. Referring to FIG. 5, the graphical user interface that displays the results is shown. The graphical user interface displays a row of numbers 70 that indicate the time interval evaluated. Symbols 71a, 71b, and 71c are associated with the time interval identified depending on the number of tests passed or failed for the particular time interval. The symbols 71 are results indicator symbols. For example, each of the symbols 71 identify the magnitude of success or failure for a given time interval. For example, the "smiley" face symbol 71a indicates that all tests are passed. The triangle with an exclamation point contained therein identified by the symbol 71b indicates that some test failed. The skull and cross-bones symbol 71c indicates that either many tests fail or a particular very serious error occurred. For the symbols 71b and 71c, a certain range or number of tests are associated with each of these symbols. For the symbol 71b, this symbol is invoked when at least one test fails for a time interval up to a user specified limit or number. The skull and cross-bones symbol 71c is utilized when the limit specified by the symbol 71b is exceeded. As shown in FIG. 5, the time intervals 1, 2, and 11 have the results indicator symbol 71b associated therewith. The symbol 71 b indicates that at least one test failed during the time interval 1, 2, and 11. Time intervals 3, 4, 5, 7, 8, 9, and 10 have the smiley face symbol 71a associated therewith. These symbols 71a indicate that no time errors occurred for the given level of test frequency for the time intervals. The time interval 6 has the skull and cross-bones symbol 70c associated therewith. Therefore, many tests failed during time interval 6 or a particular very serious error.

Also, illustrated on the user interface shown of FIG. 5, is a chart that associates various measures in a corresponding manner to indicate the parameters and results of a test suite operation. The chart specifies the time interval tested, the start date for the time interval, the test frequency for the time interval, the number of iterations of tests during the time interval and the number of failures that occurred during the time interval. For example, the chart indicates that time interval 1 begins Jan. 1, 1970 at 00:00:00 hours. Associated with this time interval is an accuracy or frequency measure. Time interval 2 was tested at a monthly frequency. During the testing of time interval 1, the system performed 1,485 interations of tests. During this time interval, 12 failures occurred. However, during the time interval 3, which begins Jan. 1, 1980, at 00:00:00 hours, no failure occurred. During the 6th time interval which performs test beginning at Dec. 31, 1999 at 23:00:00 hours, 200 failures occurred. Time period 6 was tested at a per second degree of accuracy which is the highest degree indicated herein. Consequently, the number of iterations (i.e. 396,000) for the time interval 6 is more than any other time period.

By associating and formatting the results of the test as shown in FIG. 5, a user may determine what problem an application will have and during which specific time periods. In addition to providing a format that indicates the frequency of tests for a given time interval and the number of failures that occur, the screen provides icons that give the user an option to examine the test suite descriptions in detail or to view the recommendations for actions to be taken in view of failures identified. Particularly, when a user places a user cursor on the icon 74 and selects the icon by clicking on the selection control of a mouse, the test suite descriptions are displayed as discussed in connection with FIG. 3. By selecting the icon 76 utilizing a selection mechanism such as a mouse, the user may invoke a function that displays the recommended actions on the display monitor 14. A list of recommendations is shown in Appendix A.

When a user selects the results symbol 71 listed under the test period specified, the system displays the results of the test as illustrated in FIG. 6. FIG. 6 shows a table that identifies the time interval, the test suite, number of iterations of the test suite and the failure code component I.D.'s of the test suite. The last five columns identified under each failure code component I.D. indicates the number of failures for a failure code. The failure code component forms the last two digits of a performance description code. The first digit of the failure code component is the number identified for the particular suite. For example, test suite 1 is identified by the number "1". Therefore, the failure code associated with test suite 1 and failure code component "02" is the failure code 102. The failure code associated with failure code component 03 and test suite 2 is "203". Therefore, the number in the failure code component column indicates the number of a particular type failure that occurred. The type of failure is identified by a combination of a number associated with the test suite and the failure code component identified in the column. Dashes indicate that a test suite does not have a failure code corresponding to that failure code associated with the row and column identified (i.e. test suite # and failure code component). By organizing and displaying the codes as illustrated in FIG. 6, a user can easily ascertain what problems or errors have occurred during a particular time interval of a time period. A user may view the failure codes and the corresponding description by selecting the performance code icon 90 on the screen. An error code listing is provided in Appendix B.

Figure 7:
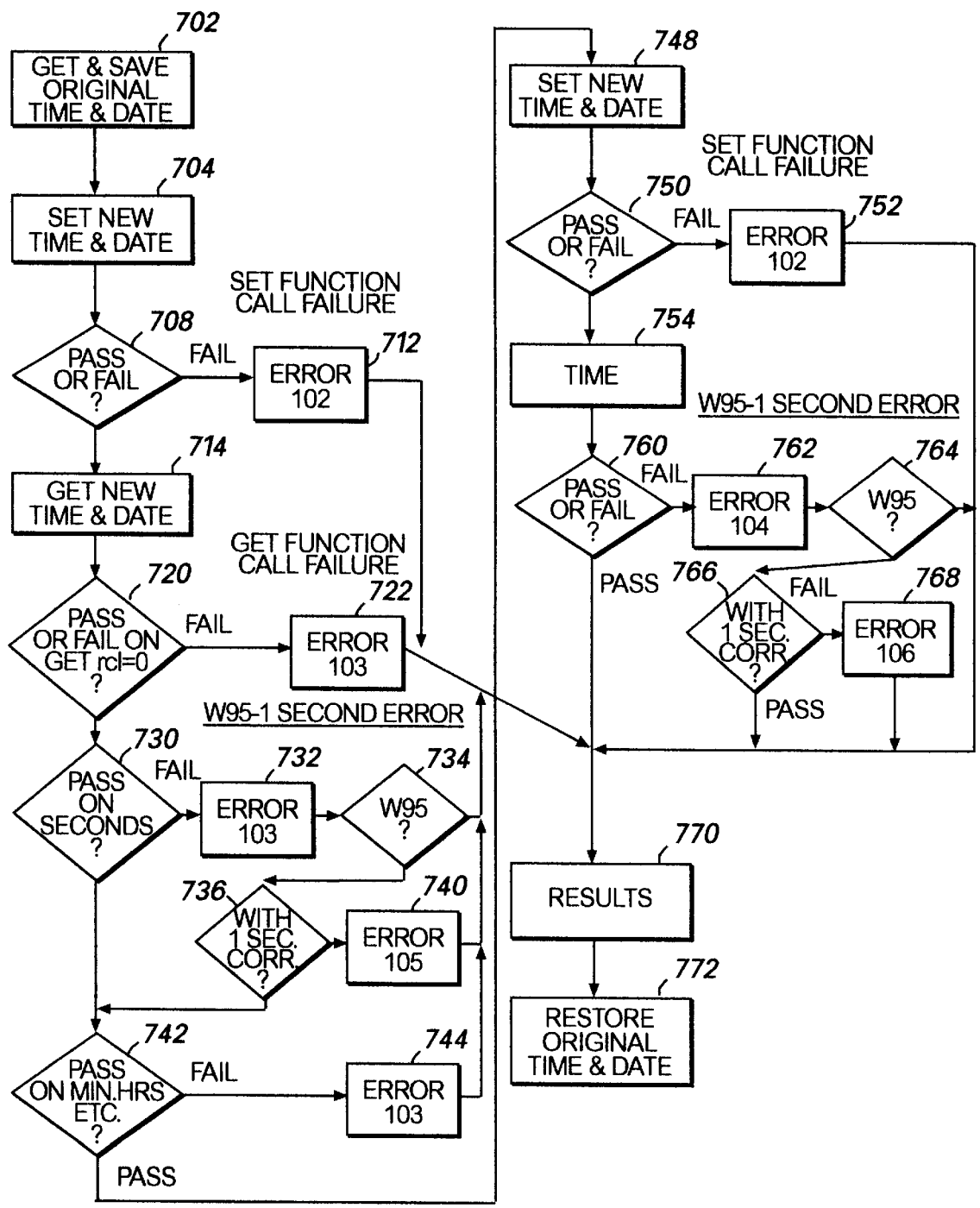
FIGS. 7–15 are flow diagrams of procedures of executed by groups of time test modules.

Referring to FIG. 7, the processes implemented according to the present invention when test suite 1 is executed is illustrated. At Step 702, the computer system retrieves and saves the original (current) time and date. At step 704, the new time and date are set. The time values used in setting the time varies based on the time interval being tested and the specific time value being tested for the time interval. At Step 708, a determination is made as to whether the set time function is performed appropriately. This determination at Step 708 is made by evaluating the return code returned, as defined by the standards, from the function executed. If a failure return code is not returned, the function passes. An actual time value is not checked at this step. For some of the function calls, only return codes are returned and no time value is returned, such a "set time" function. In these cases, the return codes are evaluated for an indication of failure of the function as indicated by the return code. As known by those skilled in the art and as defined in the standards, the function calls return certain return codes and/or time values in a specified format. These codes or time values returned are tested for the time and format that should be returned. If the correct time value or return code is not returned, the function call is considered to have failed or if the correct value or code is returned, the function passes. If the set time function fails based on the return code, the process proceeds to Step 712. At Step 712, the error message 102 is generated. If, however, at Step 708, the set time function passes the test, the process procedure to Step 714. At Step 714, the time and date is retrieved. At Step 720, a determination is made whether the get time function passed or failed. At Step 720, the system tests to determine whether the function retrieved a time value (i.e., did not return a function failure code). An actual time comparison is not made at this step. If the get time function fails, the process proceeds to Step 722, where the error message 103 is generated. The process then proceeds to Step 770 where the results are stored. If, however, at Step 720, the get time function passed, the process proceeds to Step 730. At Step 730, a determination is made whether the retrieved time passes on the "seconds test". At Step 730, an actual time comparison is made. Here, the process compares the actual time retrieved with the time that the function call should return if the function/system is operating properly. This test compares the time to the "seconds" level of accuracy for the time retrieved. If the system fails, the process proceeds to Step 732, where the error message 103 is generated. At Step 734, the process determines whether the system is a Windows '95 system. If the system is not a Windows '95 system, the process proceeds to Step 770 where the results are displayed. If, at Step 734, the system is a Windows '95 system, the process proceeds to the decision block 736. At Step 736, the results are retested to validate that they are within one second of the correct result. If, at Step 736, this test fails, the process proceeds to Step 740 where error message 105 is generated and the process proceeds to Step 770.

If, at Step 730, the calculation of the new time passes the "seconds" test, the process proceeds to Step 742. At Step 742, the process tests to determine whether the retrieved time has the proper minute, hour, day, month and/or year. At Step 742, an actual time comparison is made to determine if the system returned the correct time with respect the minute, hour, day, month and/or year as specified. If a failure occurs at Step 742, error message 103 is generated at Step 744. If, at Step 742, the time frequency test is passed, the process proceeds to Step 748. At Step 748, the new time and date are set. At Step 750, the process determines whether the new time and date that was set passes or fails. If the computer system fails at Step 752, error code 102 is generated. If, however, at Step 750, the set new time and date function passes, the process proceeds to Step 754. At Step 754, the time function is invoked. At Step 760, the process detects whether or not the time was accurately retrieved. If the time was not accurately retrieved, the process proceeds to Step 762 to where error message 104 is generated. The process then proceeds to Step 764. At Step 764, if the system is not a Windows 95 system, the process proceeds to Step 770. If, however, at Step 764, the system is a Windows 95 system, the process proceeds to Step 766. At Step 766, the results are retested to validate that they are within + or − one second of the correct result. If the computer system fails this test, error message 106 is generated. If, however, at Step 766, the computer system passes, the process proceeds to Step 770. Whenever an error message occurs, the system proceeds to Step 770 where the results are stored. At Step 772, the original time and date stored at the beginning of the process are restored to the computer system.

Figure 8:
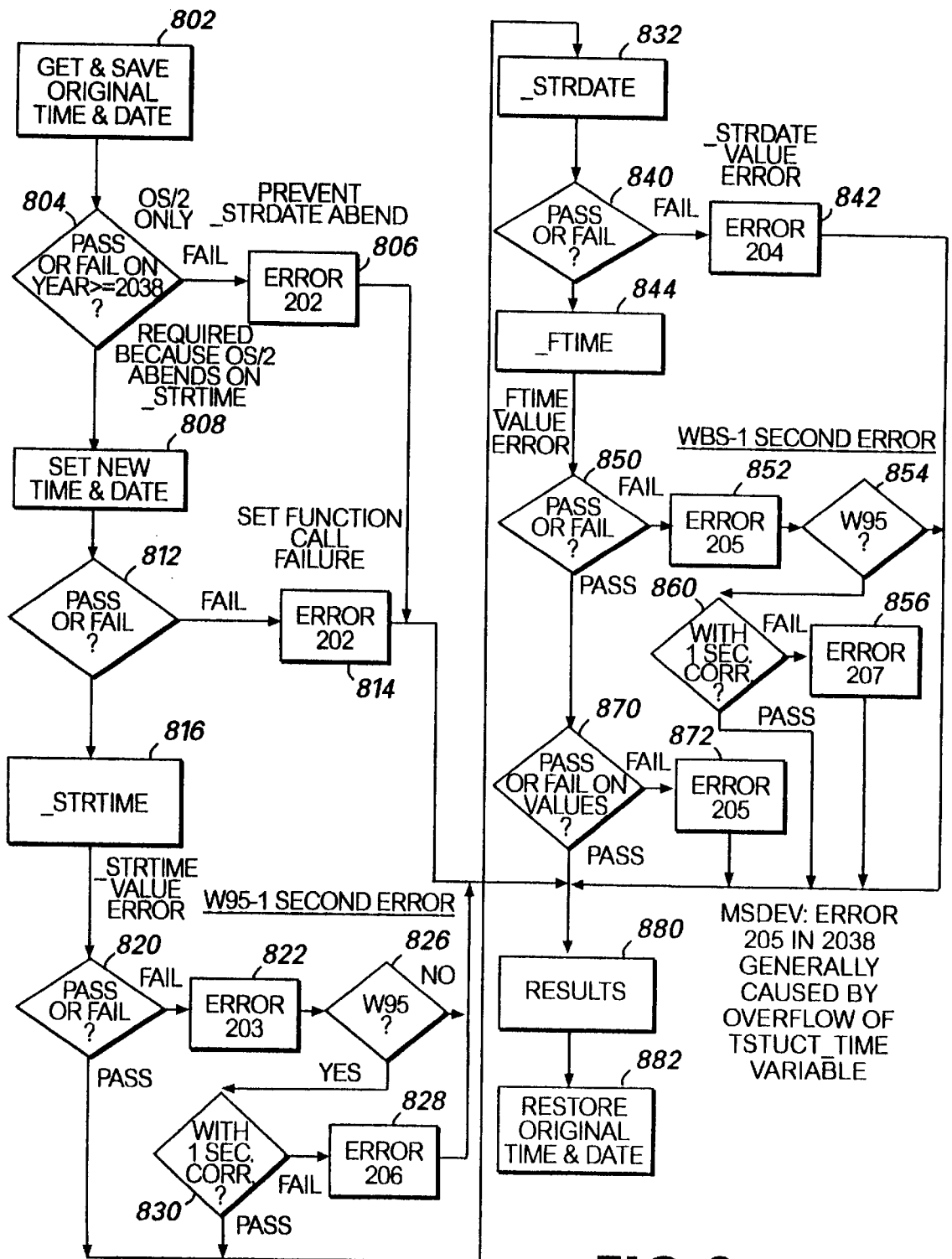

Referring to FIG. 8, the process implemented when the test suite 2 is executed is discussed. At Step 802, the original time and date for the computer system is saved. At Step 804, if the system is an OS/2 system, the process determines whether the year is greater than or equal to the year 2038. If the year is greater than or equal to 2038, the process proceeds to Step 806, where error message 202 is generated. If the error is less than 2038, the process proceeds to Step 808. This OS/2 test is unique to OS/2 and is performed to avoid an OS/2 compiler bug. At Step 808, the process sets the new time and date. At Step 812, the process determines whether the new time and date are set correctly. If the new time and date are not set correctly, the process proceeds to Step 814 where the error message 202 is generated. If, at Step 812, the new time and date are set correctly, the process proceeds to Step 816. At Step 816, the _strtime function is executed. At Step 820, the process determines whether or not the correct time is generated. If this function does not generate the correct time, the process proceeds to Step 822 where error message 203 is generated. The process then proceeds to Step 826. At Step 826, the process determines whether the system is a Windows 95 system. If the system is not a Windows 95 system, the process proceeds to Step 880. If, however, the system is a Windows 95 system, the process proceeds to Step 830. At Step 830, another test is performed to validate that the results are within + or − one second of the correct result. If the system fails at Step 830, error message 206 is generated. If, however, the computer system passes the test at Step 830, the process proceeds to Step 832. At Step 832 the _strdate function is executed. At Step 840, the process determines whether the system passed or failed the _strdate function. If the system fails this function, the process proceeds to Step 842. At Step 842, error message 204 is generated. If the system passes the test at Step 840, the process proceeds to Step 844. At Step 844, the _ftime function is implemented. The process then proceeds to Step 850. At Step 850, the process determines whether or not the system passed or failed the ftime function call. If the system fails, the _ftime function, the process proceeds to Step 852. At Step 852, error message 205 is generated. At Step 854, the process determines whether the computer system is a Windows 95 computer system. If the system is not a Windows 95 computer system, the process proceeds to Step 880. If, however, at Step 854, the system is a Windows 95 computer system, the process proceeds to Step 860, where another test is performed to validate that the results are within + or − one second of the correct result. If the system fails the test at 860, the process proceeds to Step 856 where error message 207 is generated. If, however, the system passes the test at Step 860, the process proceeds to Step 880.

If, at Step 850, the system passes the _ftime Test, the process proceeds to Step 870. At Step 870, the process determines whether or not the system passes on the addition values defined in the timeb data structure. The value "time" was validated in step 860. The values DiffMin (the number of minutes difference between local time and coordinate universal time) and the value dstflag (which indicates if daylight savings time is in effect) are validated. If the system fails the test at Step 870, the process proceeds to Step 872 where error message 205 is generated. If, at Step 870, the system passes this test, the process proceeds to Step 880 where the results are stored. For each of the previous steps for which an error message was generated, the process proceeds next to Step 880 except at Steps 822 and 852. From Step 880, the process proceeds to Step 882 where the original time and date are restored prior to initiating the test.

Figure 9:
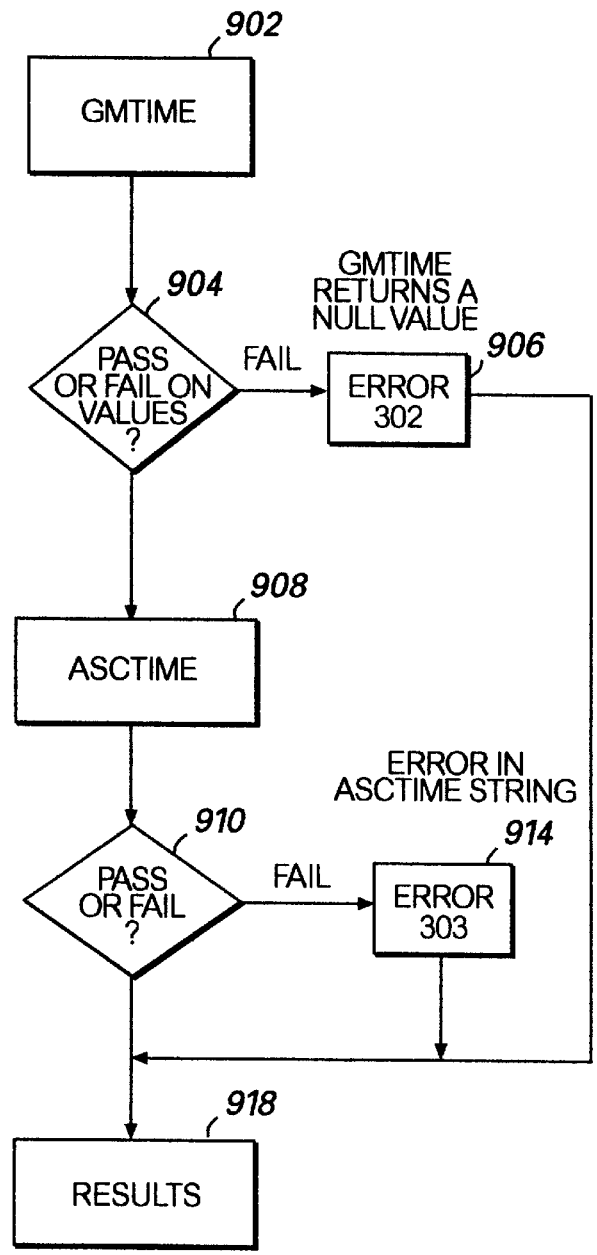

Referring to FIG. 9, the processes implemented by test suite 3 are discussed. At Step 902, the process invokes the gmtime function. At Step 904, the process tests whether the system produces correct values for the gmtime function. If the system does not produce correct values, the process proceeds to Step 906 where error message 302 is generated. A failure is indicated from the gmtime function if the gmtime function returns a NULL value. If, at Step 904, the gmtime function passes, the process proceeds to Step 908, where the asctime function is executed. At Step 910, if the computer system fails the asctime function, error message 302 is generated. If, however, the computer system passes the asctime function, the process proceeds to Step 918 where the results are stored. Whenever an error message is generated, for test suite 3, the process proceeds to Step 918.

Figure 10:
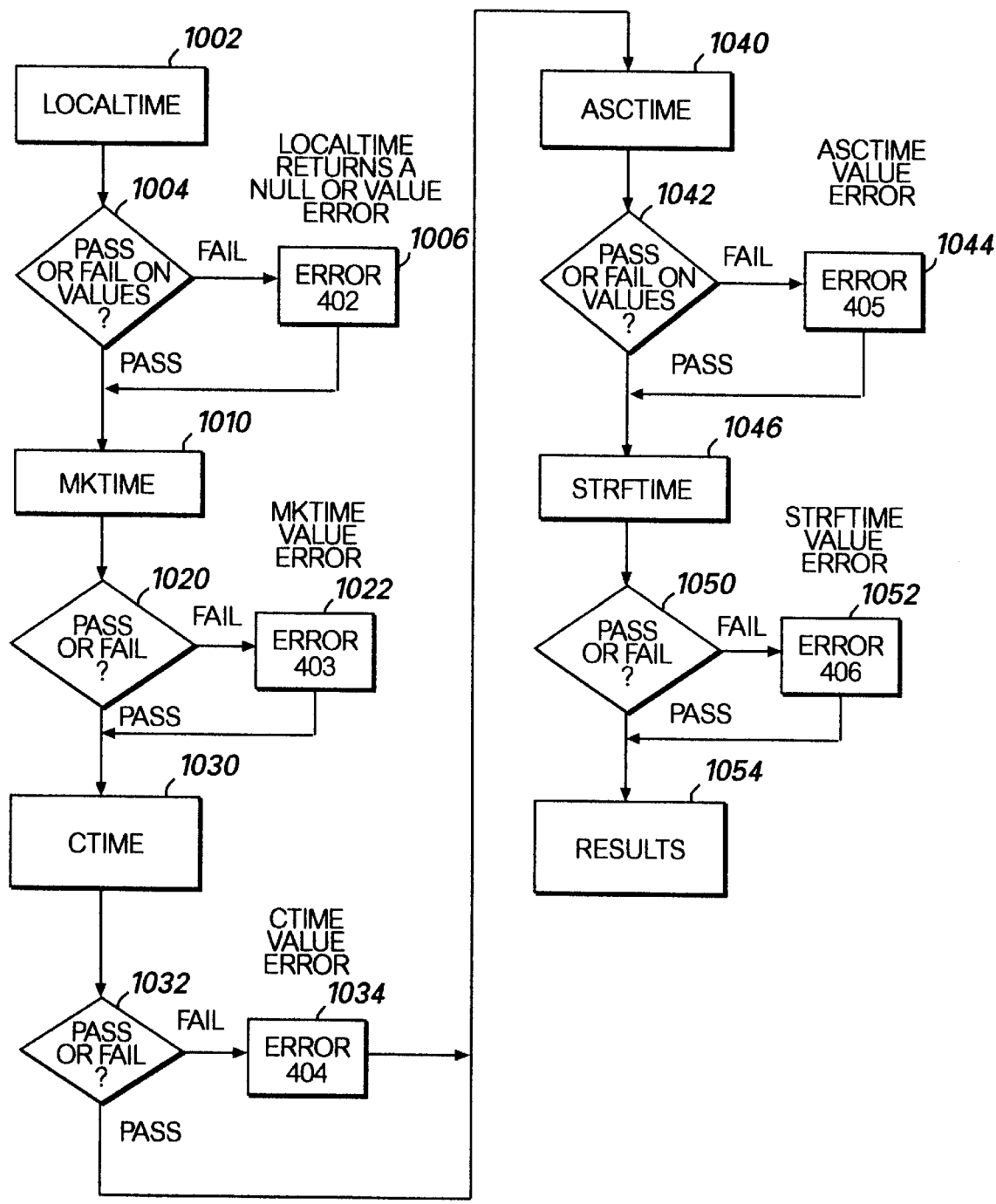

Referring to FIG. 10, the processes is implemented when test suite 4 is executed is described. At Step 1002, the localtime function is invoked. At Step 1004, the process determines whether the local time is set correctly. If the local time is not set correctly, which means that a NULL value or value error is returned, the process proceeds to Step 1006 where error message 402 is generated and thereafter the process proceeds to Step 1010. If, at Step 1004, the local time is appropriately determined, the process proceeds to Step 1010, where the mktime function is executed. At Step 1020, the process determines whether or not the system passes or fails the mktime function. If the computer system fails the mktime function, error message 403 is generated and thereafter the process proceeds to Step 1030. If, at Step 1020, the system passes the mktime function, the process proceeds to Step 1030. At Step 1030, the ctime function is executed. At Step 1032, the process determines whether the system passes or fails. If the system fails the ctime function, error message 404 is generated at step 1034 and the process proceeds to Step 1040. If, at Step 1032, the process passes the ctime function, the process passes to Step 1040. At Step 1040, the asctime function is executed. At Step 1042, the process determines whether the system passes or fails on values. If the system fails, at Step 1044, error message 405 is generated and thereafter the process proceeds to Step 1046. If, at Step 1042, the system passes the asctime function, the process proceeds to Step 1046 or the strftime function is executed. At Step 1050, the process determines whether the computer system passes or fails the strftime function. If the computer system fails the strftime function, error message 406 is generated at Step 1052 and thereafter the process proceeds to Step 1054. If, at Step 1050, the system passes this test, the process proceeds to Step 1054 where the results are stored. The process proceeds from Step 1052 to Step 1054.

Figure 11:
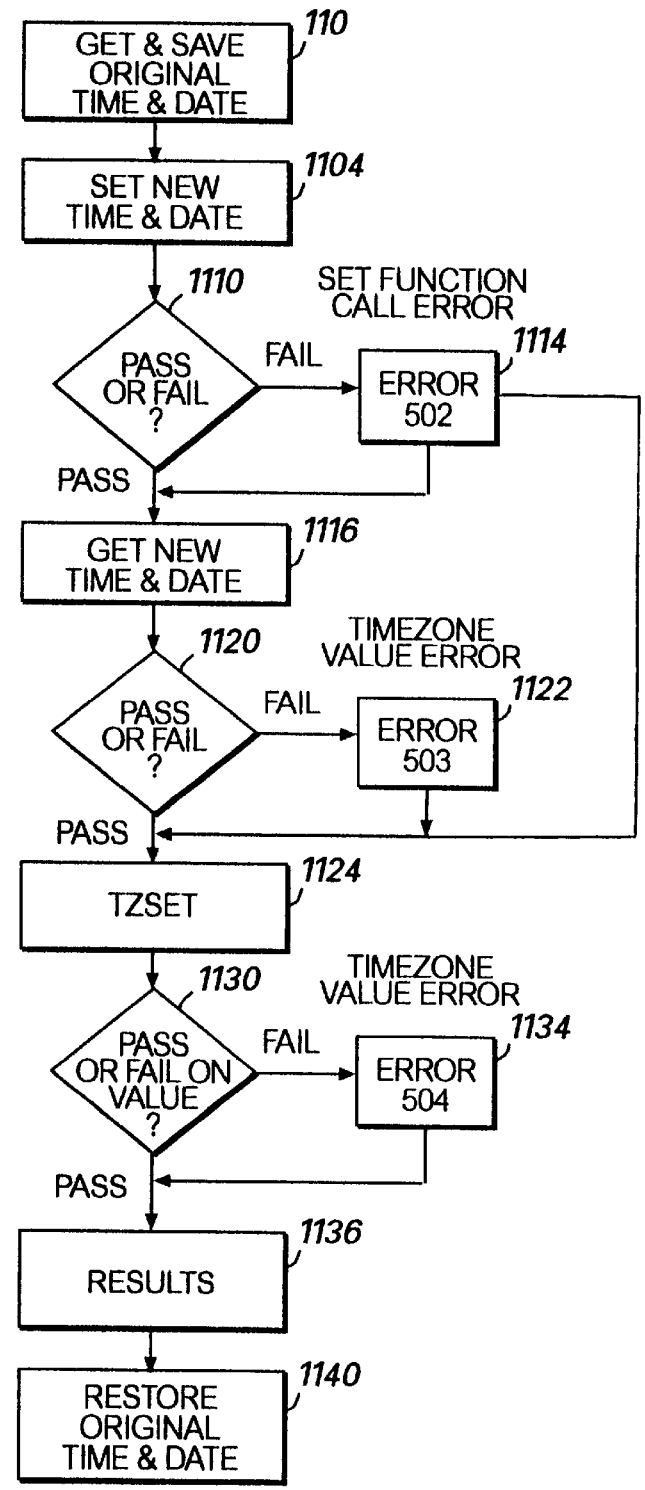

Referring to FIG. 11, the processes implemented when test suite 5 is executed is described for OS/2 and Windows 3.x systems. At Step 1102, the original time and date are saved. At Step 1104, the new time and date are set. The process proceeds to Step 1110 where it is determined whether the new time and date were set correctly. If the new time and date were not set correctly, the process proceeds to Step 1114 where error message 502 is generated. From Step 1114, the process proceeds to Step 1124. If, at Step 1110, the process did pass the test, the process proceeds to Step 1116. At Step 1116, the new time and date are retrieved. The process then proceeds to Step 1120. At Step 1120, if the system fails the test, the process proceeds to Step 1122 where error message 503 is generated. The process then proceeds to Step 1124. If, at step 1120, the computer system passes this test, the process proceeds to Step 1124 where the _tzset fluction is executed. At Step 1130, if the computer system fails the _tzset function, the process proceeds to Step 1134 where error message 504 is generated. The process then proceeds to Step 1136 where the results are stored. If, at Step 1130, the computer system passes the _tzset function, the process proceeds to Step 1136. The process then proceeds to Step 1140 where the original time and date are restored.

Figure 12:
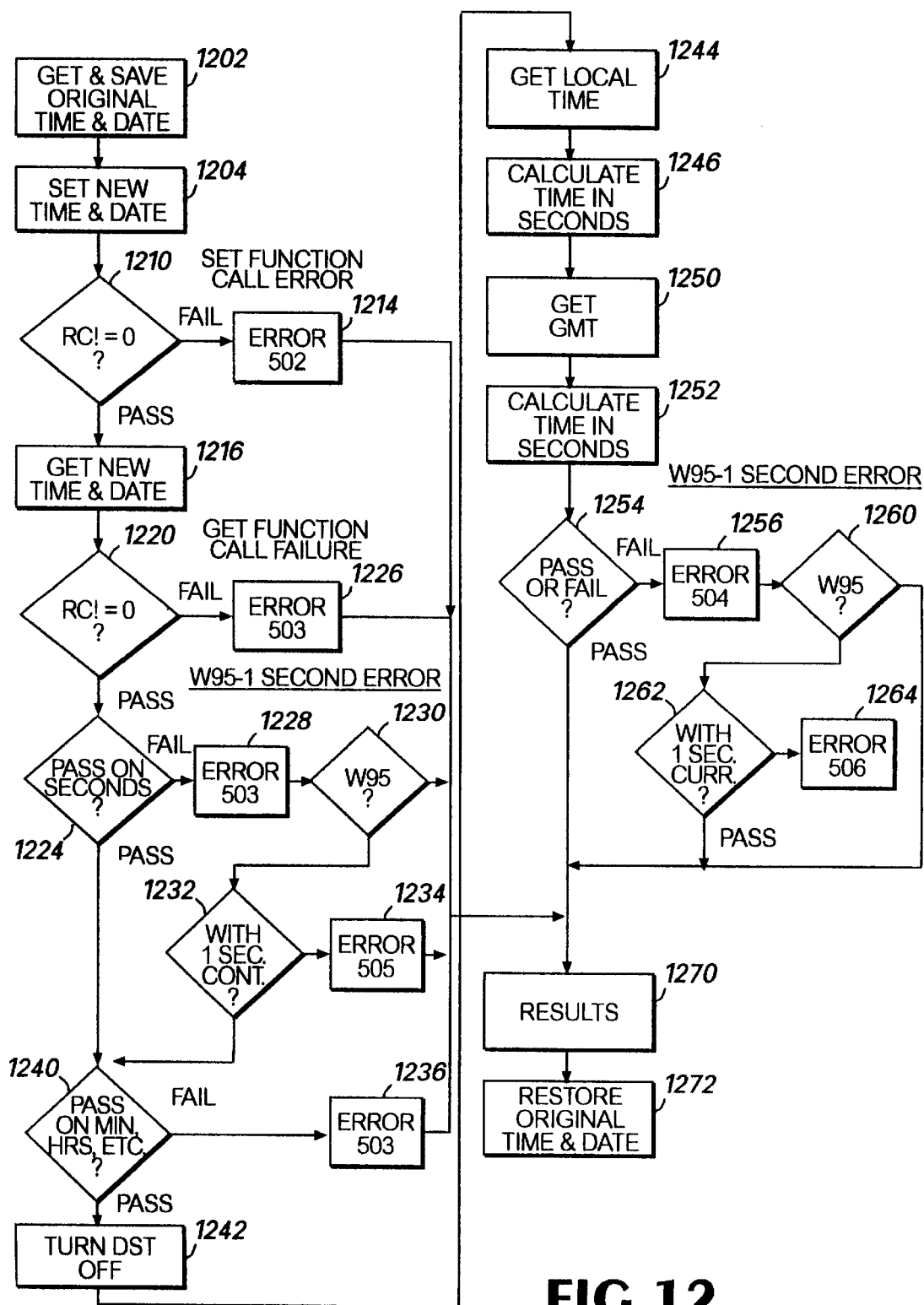

Referring to FIG. 12, the processes implemented when test suite 5 is executed is described for NT and Windows 95 systems. At Step 1202, the process gets and saves the original time and date. The process then proceeds to Step 1204. At Step 1204, the new time and date are set. The process then proceeds to Step 1210. If the new time and date are not set correctly, the process proceeds to Step 1214 where error message 502 is generated. The process then proceeds to Step 1270. If at Step 1210 the test passes, the process proceeds to Step 1216 where the new time and date are retrieved. If the new time and date are not retrieved properly at Step 1220, the process proceeded to Step 1226 where error message 503 is generated. The process then proceeds to Step 1270. If, at Step 1220, the new time and date are correctly retrieved, the process proceeds to Step 1224. At Step 1224, a test is initiated which determines whether the system passes with seconds frequency executed. If this test is not passed, an error message 503 is generated at Step 1226. The process then proceeds to Step 1230. If the system is not a Windows 95 system, the process proceeds to Step 1270. If, however, the system a Windows 95 system, the process proceeds to Step 1232 where a test is performed to validated that the results are with + or − one second of the correct result. If the computer system fails this test, error message 505 is generated at Step 1234. The process proceeds from Step 1234 to Step 1270. If, at Step 1232, the test passes, the process proceeds to Step 1240. At Step 1240, the system determines whether the get new time function passes on the hours, minutes, days, months and years test. If the computer system does not pass, error message 503 is generated at Step 1236. From Step 1236, the process proceeds to Step 1270. If at Step 1240, the computer system passes this test, the test process passes to Step 1242. At Step 1242, the day light savings time is turned off. The process proceeds to Step 1244. At Step 1244, the computer system gets the local time. At Step 1246, the local time is translated to seconds. At Step 1250, the GMT is retrieved. The GMT is translated to seconds at Step 1252. The process then proceeds to Step 1254. At Step 1254, the process determines whether the computer system passes the previous function calls. If the computer system does not pass the previous function calls, the process proceeds to Step 1256 where error message 504 is generated. The process then proceeds to Step 1260. If the computer is not a Windows 95 computer system, the process proceeds to Step 1270. If, however, the computer system is a Windows 95 computer system, the process proceeds to Step 1262. At Step 1262, a test is performed to validate that the results are within + or − one second of the correct result. If the computer system fails this test, error message 506 is generated at Step 1264 and thereafter the process proceeds to Step 1270. If, at 1262, the system passes this test, the process proceeds to Step 1270 where the results are stored. At Step 1272, the original time and date are restored.

Figure 13A:
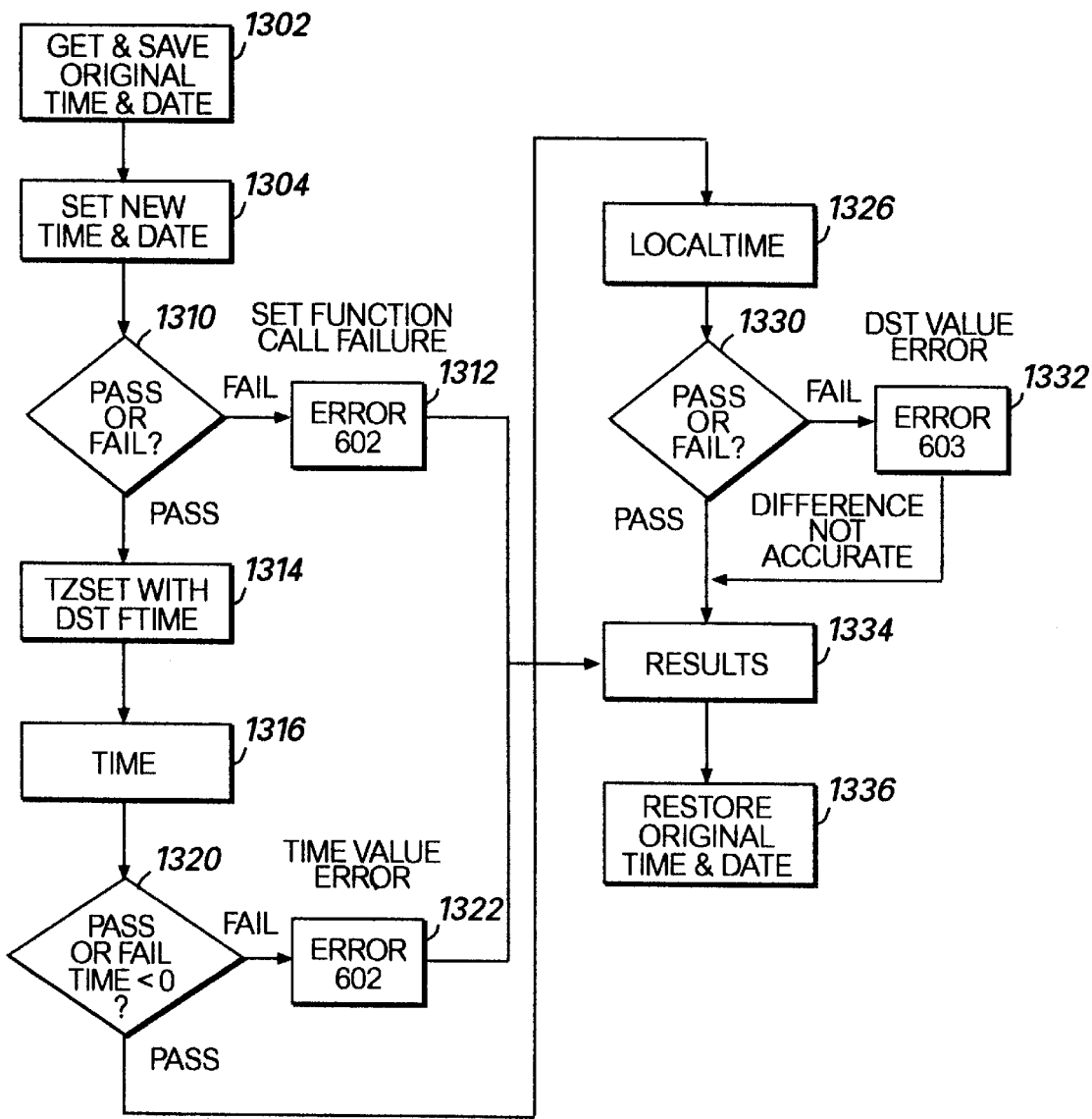

Referring to FIG. 13a, the process implemented when test suite 6 is executed for OS/2 and Windows 3.x systems is illustrated. At Step 1302, the original time and date are saved. At Step 1304, the new time and date are set. At Step 1310, if the new time and date are not set correctly, the process proceeds to Step 1312 where error message 602 is generated and thereafter the process proceeds to Step 1334. If the correct time was set at Step 1310, the process proceeds to Step 1314 where _tzset is executed to turn day light saving time on and ftime is executed. At Step 1316, the time function is executed. The process then proceeds to Step 1320. If the time function does not generate the correct value (i.e. the time is less than zero) then the process proceeds to Step 1322 where error message 602 is generated. The process proceeds to Step 1334 from Step 1322. If, at Step 1320, the correct time was determined the process proceeds to Step 1326 where the localtime function is executed. At Step 1330, if the local time was not correctly determined, error message 603 is generated at Step 1332 and thereafter the process proceeds to Step 1334. If, at Step 1330 the correct local time was determined, the process proceeds to Step 1334. At Step 1336, the original time and date are restored.

Figure 13B:
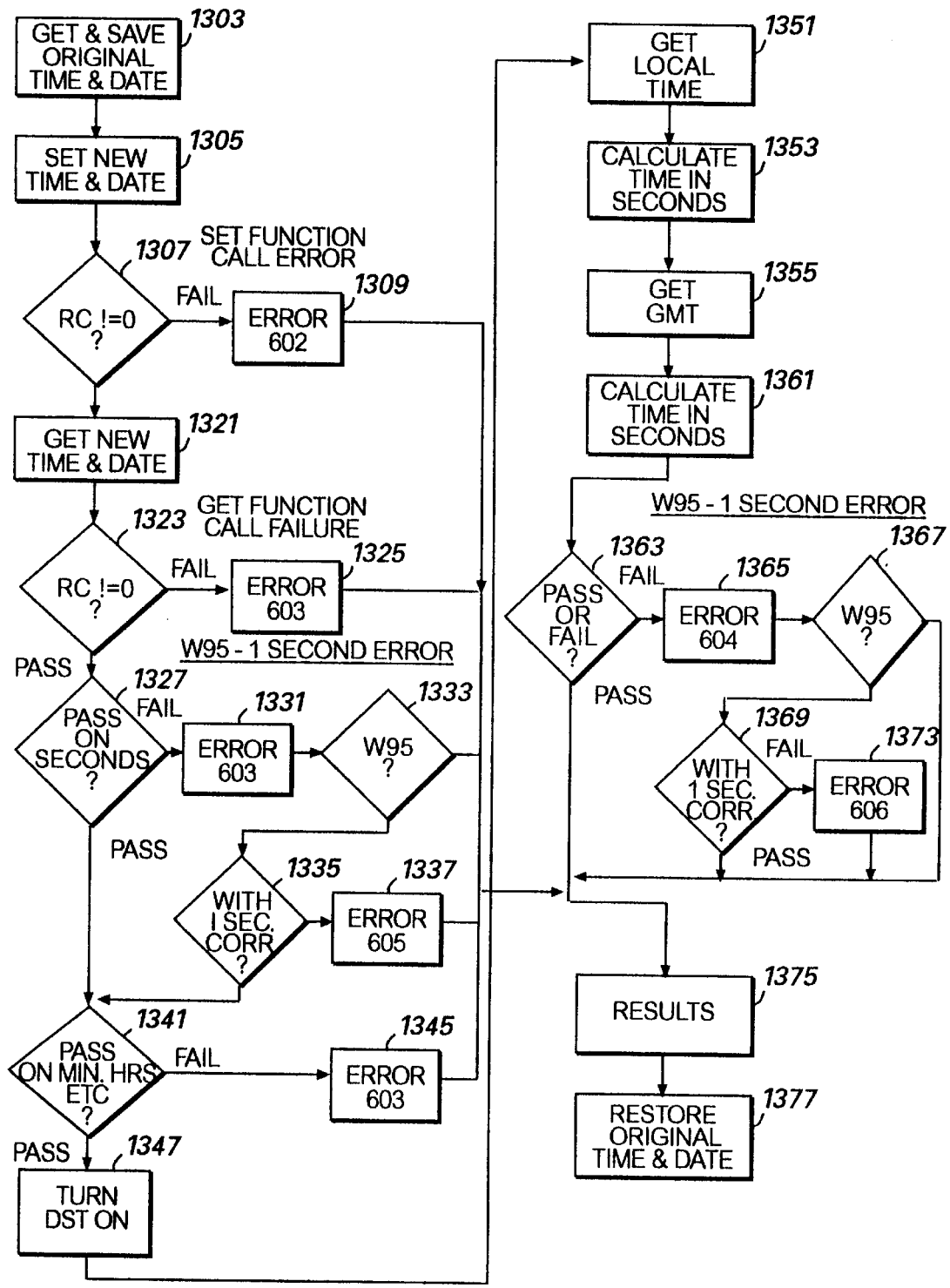

Referring to FIG. 13b, the process is performed when test suite 6 is executed on an NT or Windows 95 based operating system is illustrated. At Step 1303, the original time and date of the computer system is saved. At Step 1305, the new time and date are set. If the new time and date are not set properly, the process proceeds from Step 1307 to Step 1309. At Step 1309, error message 602 is generated. The process proceeds from Step 1309 to Step 1375. If, at Step 1307, the new time and date were set properly, the process proceeds to Step 1321. At Step 1321, the new time and date are retrieved. If the new time and date are not retrieved properly, then at Step 1323 the process proceeds to Step 1325 where error message 603 is generated. The process then proceeds to Step 1375 where the results are stored. If, at Step 1323, the new time and date were set properly, the process proceeds to Step 1327. At Step 1327, a determination is made as to whether the new time and date are set correctly with respect to seconds values. If the new time and date were not set correctly, error message 603 is generated at Step 1331. The process proceeds to Step 1333 where it is determined whether the system is a Windows 95 system. If the system is not a Windows 95 system, the process proceeds to Step 1375. If, however, at Step 1333, the computer system is executing Windows 95, a test is performed to validate that the results are within + or − one second of the expected result. If the computer system fails the test at 1335, error message 605 is generated at Step 1337 and thereafter the process proceeds to Step 1375. If, however, the test passes at Step 1335, the process proceeds to Step 1341 where other intervals of time are tested. If the other intervals of time tested fail for the computer system, the process proceeds to Step 1345 where error message 603 is generated. The process proceeds to Step 1375. At Step 1341, if the computer system passes the correct time for the get new time and date function, the day light savings times function is turned on at Step 1347. The process proceeds to Step 1351. At Step 1351, the local time is retrieved. This time is translated to seconds at Step 1353. The process then proceeds to Step 1355 where the GMT function is executed. This time is translated to seconds at Step 1361. At Step 1363, the procedure determines whether or not the time generated from the GMT passes or fails. If the computer system fails, the process proceeds to Step 1365. At Step 1365, error message 604 is generated. The process then proceeds to Step 1367. At Step 1367, if the computer system is not a Windows 95 computer system, the process proceeds to Step 1375. If, however, the computer system is a Windows 95 computer system, the process proceeds from Step 1367 to Step 1369. At Step 1369, a test is performed to validate that the results are within + or − one second of the expected results. If the computer system fails the test at Step 1369, error message 606 is generated at Step 1373. The process proceeds to Step 1375. If the computer system passes the test at 1369, the process proceeds to Step 1375. At Step 1377, the original time and date are restored.

Figure 14:
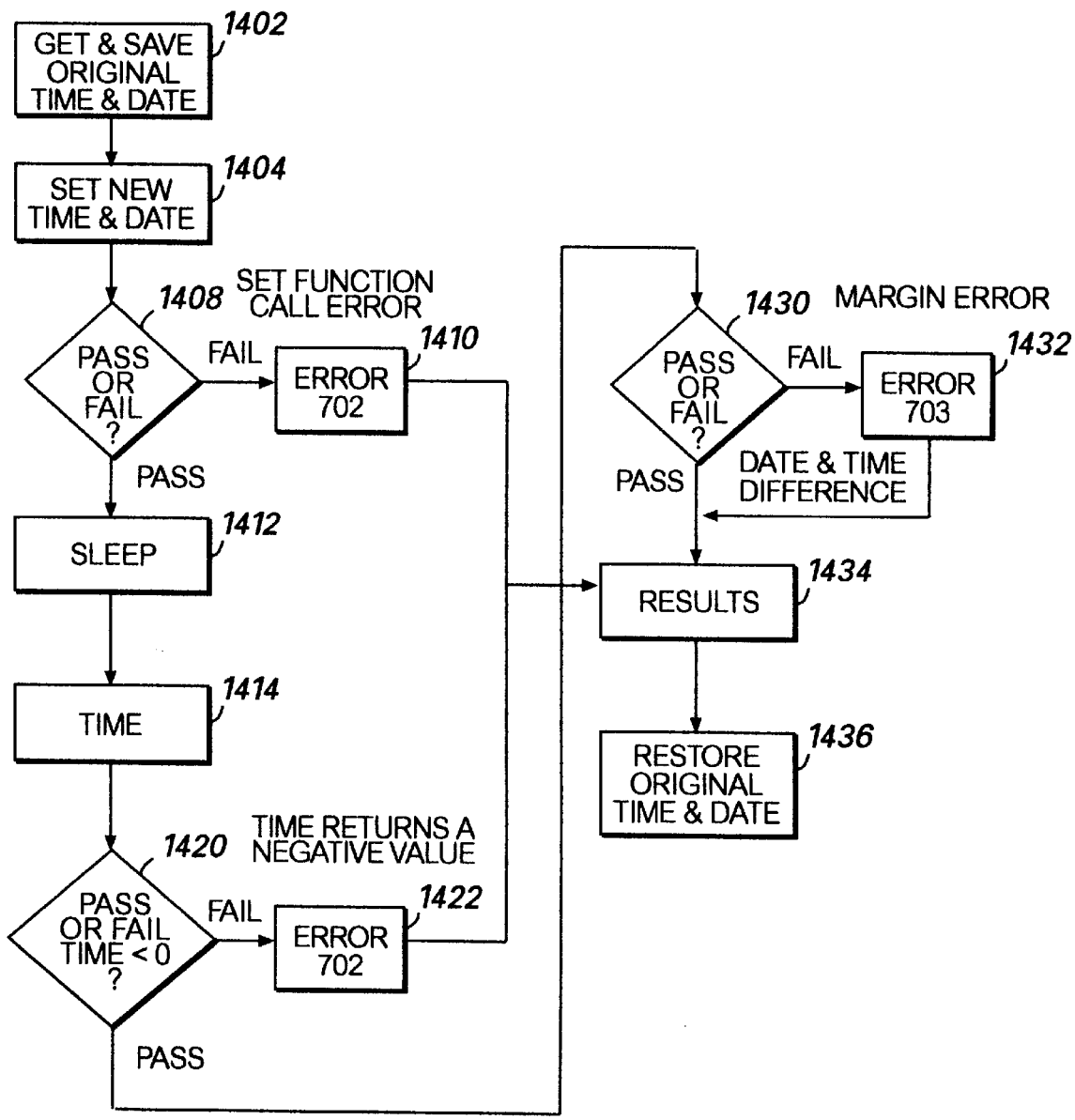

Referring to FIG. 14, the test procedures implemented when test suite 7 is executed is described. At Step 1402, the original time and date are saved. At Step 1404, the new time and date are set. At Step 1408, if the new time and date are not set properly, the process proceeds to Step 1410 where error message 702 is generated. The process then proceeds to Step 1434 where the results are stored. If the computer system passes the test at Step 1408, the process proceeds to Step 1412 where the sleep function is executed. The process then proceeds to Step 1414 where the time function is executed. At Step 1420, the procedure determines whether the time is retrieved properly. If the time is less than zero then the system fails the test. If the system fails the test at Step 1420, the process proceeds to Step 1422 where error message 702 is generated. The process then proceeds to Step 1434. If, however, at Step 1420, the computer system passes the test, the process proceeds to Step 1430. At Step 1430, a pass or fail test is initiated. If the computer system does not pass this test, error message 703 is generated. The process then proceeds to Step 1434. If, at Step 1430, the computer system passes the test, the process proceeds to Step 1434 where the results are stored. The process then proceeds to Step 1436 where the original time and date are restored for the computer system.

Figure 15A:
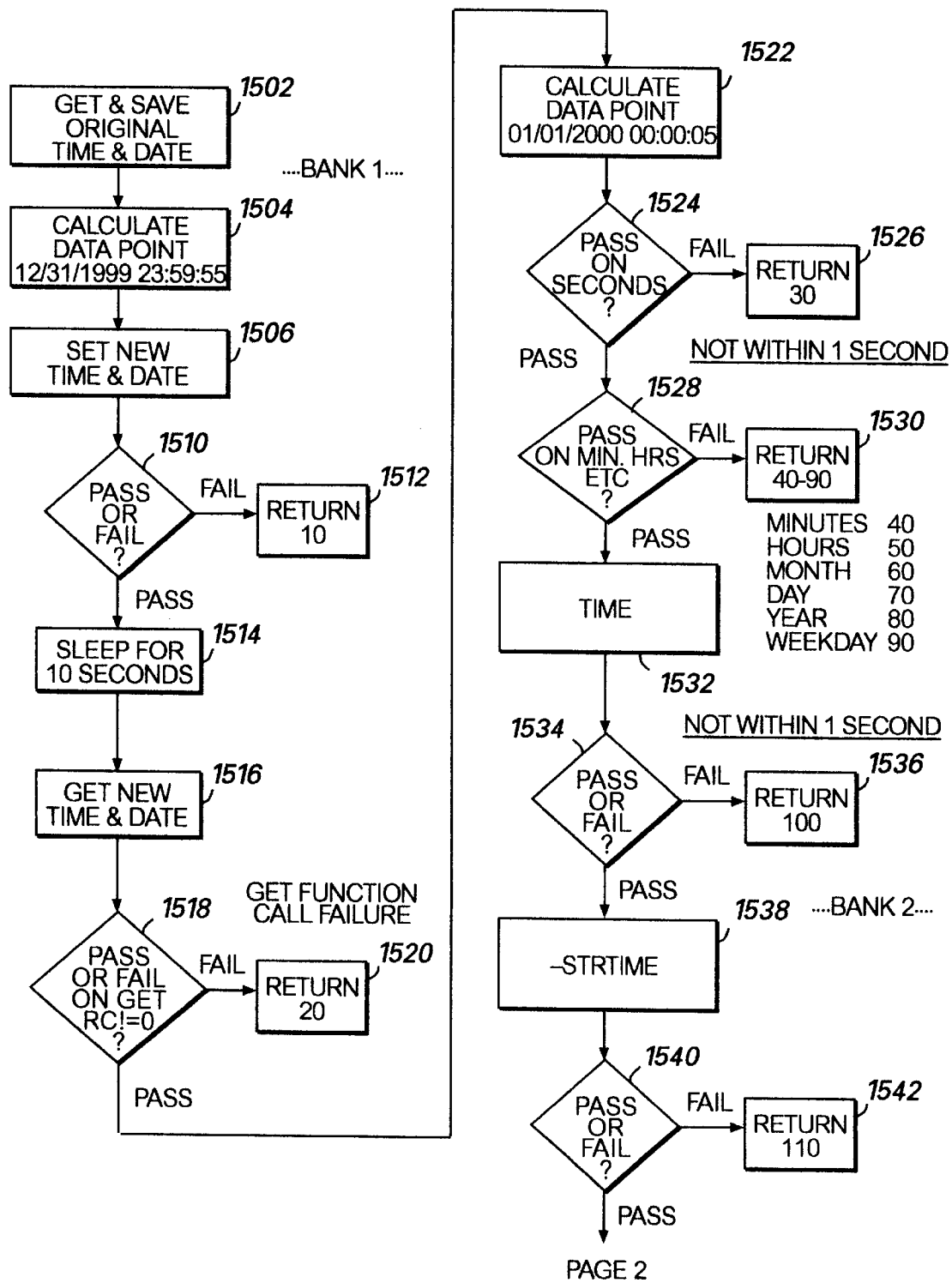
Figure 15B:
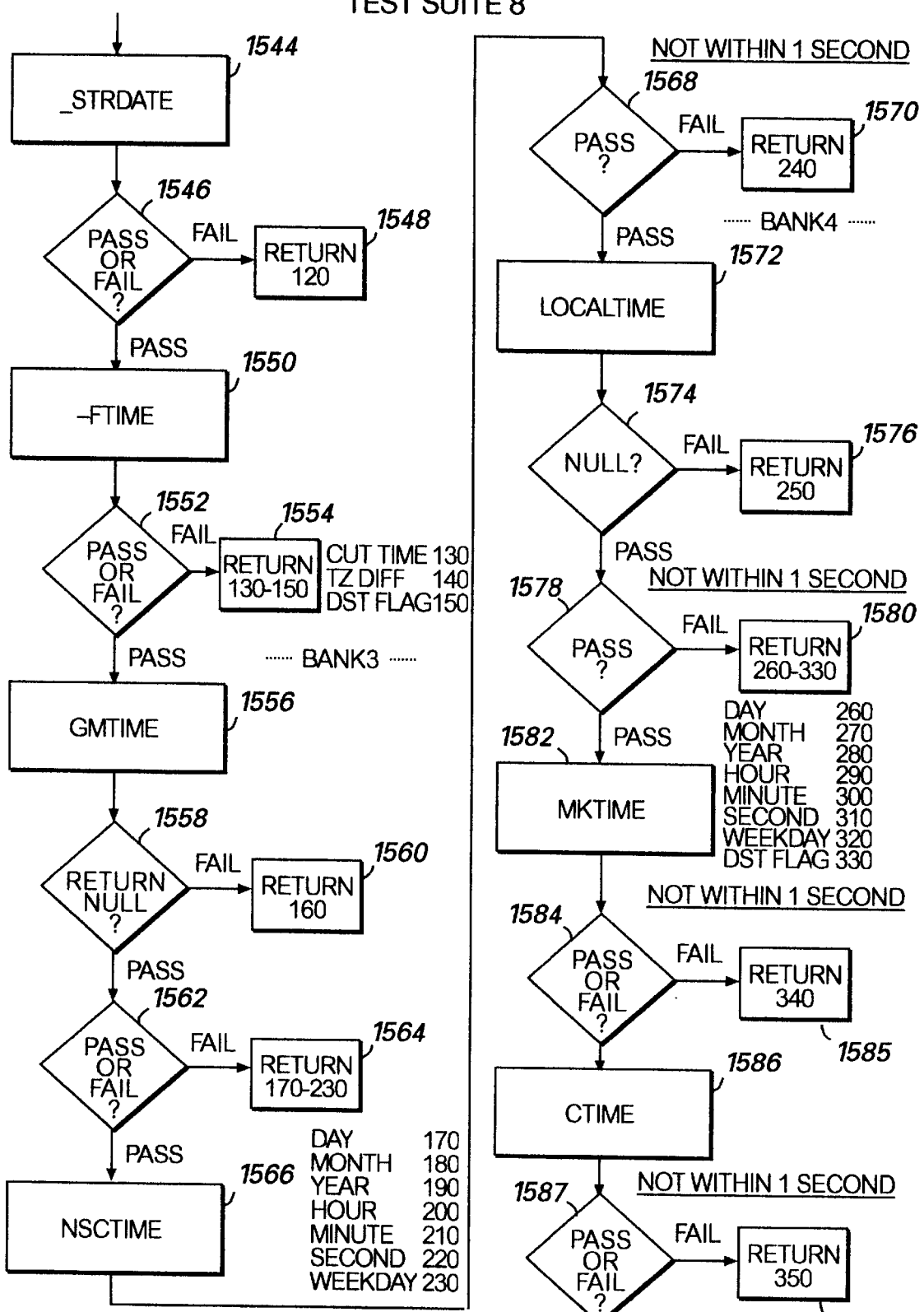
Figure 15C:
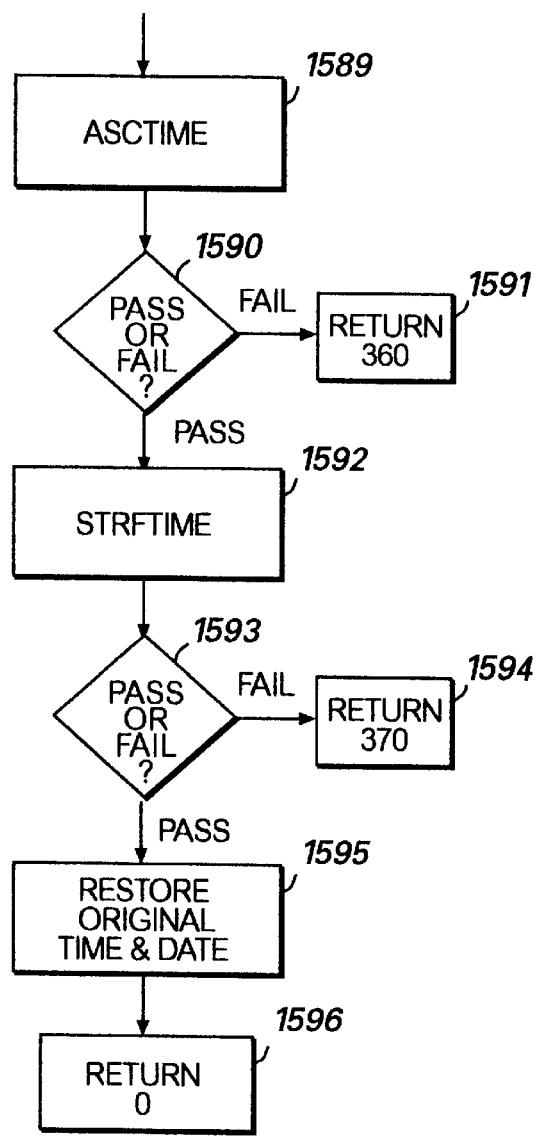

Referring to FIG. 15, the processes performed when test suite 8 is executed for OS/2 and Windows 95 systems is described. The intent of this test suite is to set the time and date before midnight on Dec. 31, 1999, then wait until the date and time roll over to year 2000, and then to verify that the system correctly responds to the new rollover values. At Step 1502, the process retrieves and store the time and date specify in the computer system when execution of the test bank begins. At Step 1504, a specific data point, slightly before midnight Dec. 31, 1999, is calculated Dec. 31, 1999 23:59:55. The process then proceeds to Step 1506 where the computer system sets the new time and date to be tested for this test bank. The process proceeds to Step 1510 where the process determines whether the new time and date are set correctly. If the time and date are not set correctly, the process proceeds to Step 1512 where the value "10" is returned. If however at Step 1510, the computer system passes the test, the process proceeds to Step 1514 where the sleep function is executed for ten (10) seconds. The process then proceeds to Step 1516 where the new time and date are retrieved. The process then proceeds to Step 1518 where the process determines whether the computer system passes the new time and date function executed at Step 1516. If the computer system fails this step, the process proceeds to Step 1520 where the value "20" is returned. The process then proceeds to Step 1522 where a new data point is calculated. This new data point is Jan. 1, 2000 00:00:05. Since the original time was set to Dec. 31, 1999 23:59:55, and the system waited for ten seconds, the new time must be Jan. 1, 2000 00:00:05 or if not, there is an error.

At Step 1524, the process determines whether the computer system passes that calculation of this data point at the "seconds" frequency. If the computer system does not pass this test, at Step 1526, the computer system returns the value "30". The return values are recorded in an error log to assist in detailed analysis of failures. If, at Step 1524, the computer the system passes at the "seconds" level of accuracy, the process passes to Step 1528. At Step 1528, the process determines whether the computer system correctly calculates data points for the following intervals: minutes, hours, months, day, year, and weekday. If the computer system does not pass the test implemented at Step 1528, the computer system returns the values "40", "50", "60", "70", "80", and "90", for failures at the minutes, hours, months, days, years, or weekday levels, respectively.

If, at Step 1528, the computer systems passes at each time interval, the process proceeds to Step 1532 where the time function is implemented. The process then proceeds to Step 1534 where the process determines whether the time function provided correct values. If there was a time function failure, the process proceeds to Step 1536 where the value "100" is returned. If the time function operates properly, it is determined at Step 1534, the process proceeds to Step 1538. At Step 1538, the _strtime function is executed. At Step 1540, a process determines whether the computer system properly executed this function. If the computer did not properly execute the _strtime function, the value "110" is returned at Step 1542. If, however, the process properly executes the _strtime function, the process proceeds to Step 1544 where the _strdate function is executed. At Step 1546, the process determines whether the computer properly executed the _strdate function. If the computer system did not properly execute the _strdate function, the process proceeds to Step 1548 where the value "120" is returned.

If, at Step 1546, the computer system properly executed the _strdate function, the process proceeds to Step 1550 where the _ftime function is executed. At step 1552, the process determines whether the computer system properly executed _ftime function. If the computer system fails execution of this function, the process proceeds to Step 1554 where the value "130" is returned for CUT time, the value "140" is returned for TZdiff, the value of "150" is returned for DST flag. If, however, at Step 1552, the computer system passes the _ftime function, the process proceeds to Step 1556 where the gmtime function is executed. At Step 1558, the computer system evaluates the results of the gmtime function. If NULL value is not returned, the system proceeds to Step 1560 where the "160" is returned. If, however, at Step 1558 the value returned is the null value, the process proceeds to Step 1562. At Step 1562, the process determines whether the computer system passes or fails. If the computer system fails, the process proceeds to Step 1564 where the value "170", "180", "190", "200", "210", "220", and "230" are returned if the system fails for the day, month, year, hour, minute, second, or week day interval, respectively. If the computer system passes the test at 1562, at Step 1566 the asctime function is executed. At Step 1568, the process determines whether the computer system passes or fails execution of this :function. If the computer system fails, the process returns the value "240" at Step 1570. If, however, the computer system passes the Step at 1568, the computer system executes the local time function at Step 1572. The process proceeds to Step 1574 where the process determines whether the null value is returned. If the null value is not returned, the process proceeds, to Step 1576 where the value "250" is returned. If, at Step 1574, the null value was returned, the process proceeds to Step 1578. At Step 1578, the computer system determines whether the local time function passed or failed. If the local time function failed in its execution, the values "260", "270", "280", "290", "300", "310", "320", or "330" are returned depending on whether the computer system failed the day, month, year, hour, minute, second, weekday, DST flag, respectively. If the computer system passes the test at Step 1578, the process proceeds to Step 1582 where the mktime function is executed. At Step 1584, the process determines whether the mktime function executed properly. If the computer system failed execution of the mktime function, the process proceeds to Step 1585 where the value "340" is returned. If the computer system passes execution of the mktime function as determined at Step 1584, the process proceeds to Step 1586. At Step 1586, the ctime function is executed. At Step 1587, the process determines whether the computer system passes execution of the ctime function. If the computer system does not pass execution of the ctime function, the proceeds to Step 1588 where the value "350" is returned.

If, at Step 1587, the computer system passes execution of the ctime function, the process proceeds to Step 1589 where the asctime function is executed. The process then proceeds to Step 1590 where the process determines whether the asctime function passed or failed its execution. If the asctime function failed execution, the value "360" is returned at Step 1591.

If, at Step 1590, the computer system passed execution of the asctime, the process proceeds to Step 1592. At Step 1592, the strftime function is executed. At Step 1593, the process determines whether the computer system passed or failed execution of the strftime function. If the computer system failed execution of the strftime function, the value "370" is returned at Step 1594. If, at Step 1593, the computer system passes execution of the strftime function, the proceeds to Step 1595 where the original time and date are stored when execution of test suite 8 began is restored. The process then proceeds to Step 1596 where the value "0" is returned. Test suite 8 varies slightly for NT and Windows 95 due to differences in these platforms.

While the present invention has been illustrated by the description of the preferred and alternative embodiments and while the embodiments have been described in considerable detail, it is not the intention of the applicants to restrict or anyway limit the scope of the appended claims to such detail. Additional advantages and modifications will readily appear to those skilled in the art. Also, as these test suites are ported to other systems including UNIX, the implementations will vary slightly due to differences in system capabilities and variations in the Application Program Interfaces (APIs). Such implementations and variations fall within the scope of this invention. The invention's broader aspects are therefore not limited to the specific details, represented apparatus and method, an illustrative example shown and described. Accordingly, departures may be made from such details without departing from the spirit or scope of applicant's general inventive concepts.

APPENDIX A: CORRECTIVE ACTIONS

Recommendation f101
No action necessary.
f102
f102 failures normally indicate an failure at the operating system of BIOS level. Most of these failures will occur in years prior to 1985 and after 2037. Therefore, at the application layer, they may not be of any concern. Some machines fail, however, at year 2000 and thereafter. These failures will be catastrophic at the application layer. Contact the hardware supplier and operating system vendor for resolution.
f103
Same recommendation as for failure f102.
f104
Same recommendation as for failure f102.
f201
No action necessary.
f202
Same recommendation as for failure f102.
f203
f203 failures, based on our testing methodology, indicate a failure at the operating system (usually) or language levels. Contact the operating system vendor to request a repair.
f204
Same recommendations as for failure f203.
f205
Same recommendations as for failure f203.
f301
No action necessary.
f302
f302 failures would normally indicate an failure at the operating system or compiler level. Contact the operating system and compiler vendors.
f303
f303 failures are normally due to formatting irregularities, and are not necessarily failures in content. Failures in content would be indicated by f302 failures.
f401
No action necessary.
f402
f402 failures would normally indicate an failure at the operating system or computer level. Contact the operating system and compiler vendors.
f403
f403 failures would normally indicate an failure at the operating system or compiler level. Contact the operating system and compiler vendors.
f404
f404 failures would nonnally indicate an failure at the operating system or compiler level. Contact the operating system and compiler vendors.
f405
f405 f404 failures would normally indicate an failure at the operating system or compiler level. Contact the operating system and compiler vendors.
F406
f406 failures would normally indicate an failure at the operating system or compiler level. Contact the operating system and compiler vendors.
f501
No action necessary.
f502
f502 failures normally indicate an failure at the operating system level. Most of these failures will occur in years prior to 1985 and after 2037. Therefore, at the application layer, they may not be of any concern. Some machines fail at year 2000 and thereafter. These failures will be catastrophic at the application layers. Contact the operating system vendor for resolution.
f503
Same as f103.
f504
f504 failures would normally indicate an failure at the operating system or compiler level. Contact the operating system and compiler vendors.
f601
No action necessary.
f602
f602 failures normally indicate an failure at the operating system level. Most of these failures will occur in years prior to 1985 and after 2037. Therefore, at the application layer, they may not be of any concern. Some machines fail at year 2000 and thereafter. These failures will be catastrophic at the application layers. Contact the operating system vendor for resolution.
f603
Same as f103.
f604
f604 failures would normally indicate an failure at the operating system or compiler level. Contact the operating system and compiler vendors.
f701
No action necessary.
f702
Same as f103.
f703
These failures would indicate either an extremely loaded system or a failure at the opening system level. We suggest contacting your operating system vendor.

APPENDIX B: FAILURE CODE LISTING

Description f101
f101 documents the number of iterations of the Get/Set Time & Date test suite. It is not an failure.
f102
f102 documents the number of failures recorded testing the SetSystemTime( ) function call or its equivalent for setting time and date. Failure setting the date results in the system's time and date parameters being set to unpredictable values. If f102 occurs, tests for failures f103 and f104 are aborted.
f103
f103 documents the number of failures recorded testing the GetSystemTime( ) function call or its equivalent for getting time and date values. Failure getting time and date results in unpredictable values being returned.
f104
f104 documents the number of failures recorded testing the time( ) function call. The function time( ) should retrieve the time in Coordinated Universal Time (CUT) format (the number of seconds elapsed from January 1, 1970, 00:00:00). CUT was previously called Greenwich Mean Time (GMT).
f201
f201 is the number of iterations performed on the tests in their test suit. It is not an failure.
f202
This is the same failure as f102. If failure f202 occurs, tests for failures f203, f204, and f205 are aborted.
f203
f203 documents the number of failures recorded testing the _strtime( ) function call. Failure f203 indicates that the information returned from this function call is incorrect.
f204
f203 documents the number of failures recorded testing the _strdate( ) functions call. Failure f203 indicates that the information returned from this function call is incorrect.
f205
Failure f203 documents the number of failures recorded testing the _ftime( ) function call. Failure f203 indicates that the information returned from this function call is incorrect.
f301
f301 is the number of iterations performed of the tests in this test suite. It is not an failure.
f302
f302 documents the number of failures recorded testing the gmtime( ) function call. Failure 302 indicates that the information returned by the function call is incorrect.
f303
f303 documents the number of failures recorded attempting to validate that asctime( ) formats the values returned by gmtime( ) properly into a data string.
f401
f401 is the number of iterations performed of the tests in this test suite. It is not an failure.
f402
f402 documents the number of failures recorded testing the local time( ) function call. Failure 402 indicates that the information returned by the function call is incorrect.
f403
f403 documents the number of failures recorded testing mktime( ) function call. Failure 403 indicates that the information returned by the function call is incorrect.
f404
f404 documents the number of failures recorded testing the mktime( ) function call. Failure 403 indicates that the information returned by the function call is incorrect.
f405
f405 documents the number of failures recorded testing the asctime( ) function call. Failure 405 indicates that the information returned by the function call is incorrect.
f406
f406 documents the number of failures recorded testing the strftime( ) function call. Failure 406 indicates that the information returned by the function call is incorrect.
f501
f501 is the number of iterations performed of the tests in this test suit. It is not an failure.
f502
f502 is the same failure as f102. If this failure occurs, there is no test for f503.
f503
Same as f103.
f504
F504 documents the number of failures recorded testing the _tzset( ) function call (OS/2) or the SetTimeZoneInformation( ) function call on NT and Windows 95. The function calls should set the time zone parameters for your computer system so that the system correctly adjusts CUT time to local time.
f601
f601 is the number of iterations performed of the tests in this test suite. It is not an failure.
f602
This is the same failure as f102. If this failure occurs, there is no for f603.
f603
Same as f103.
f604
F604 documents the number of failures recorded testing the _tzset( ) function call (OS/2) or the SetTimeZoneInformation( ) function call on NT and Windows adjusted for Daylight Savings Time. The function calls should set the time zone parameters for your computer system so that the system correctly adjusts CUT time for local daylight savings time.
f701
This is the number of iterations performed of the tests in this test suite. It is not an failure.
f702
This failure is the same as failure f103.
f703
Failure f703 documents the number of failures recorded because the system did not properly handle the sleep function call.

I claim:

1. In a computer system that has a plurality of computer program modules that perform time-based operations in a computer system, a method for determining whether time operations within a computer system function properly, comprising the steps of:

(a) selecting a first group of computer program modules tom one of a basic input/output system (BIOS) and an operating system said first group being selected to test a first set of related time-based operations within said computer system;

(b) executing said first group of program modules for each of a plurality of first preselected time values;

(c) determining whether execution of said first group of program modules for said first set of time values indicates that at least one of the functions executed by one of said program modules yielded an incorrect time calculation; and (d) storing the result of said step (c).

2. The method of claim 1 further comprising the steps of:

(e) selecting a second group of said computer program modules, said second group being selected to test a second set of related time-based operations within said computer system;

(f) executing said second group of program modules with a plurality of preselected time values;

(g) determining whether execution of said second group of program modules for said time values indicates that at least one of the functions executed by one of said program modules yielded an incorrect time calculation; and (h) storing the result of step (g).

3. The method of claim 1 refer comprising the step of:

(i) executing said first group for a second set of predetermined time values; and (j) determining whether execution of said first group of program modules for said second set of time values indicates that at least one of the function executed by one of said program modules yielded an incorrect time calculation.

4. The method of claim 3 wherein said first set of predetermined time values represent smaller units of time than said second set of time values.

5. The method of claim 4 wherein said first set of predetermined time values represents seconds and wherein said second set of predetermined time values represents minutes, hours, days, months, or years.

6. The method of claim 1 wherein at least some of said computer program modules are selected from the group consisting of time, ctime, asctime, localtime, gmtime, or mktime modules of a personal computer system.

7. In a computer system that has a plurality of computer program modules that perform time-based operations in a computer system, a method for determining whether time operations within a computer system function properly, comprising the steps of:

provided a plurality of different time function manipulation modules;

grouping certain of said time function manipulation modules into related function test groups;

sequentially executing each of said related test groups during selected time intervals;

identifying time calculation failures that occurred during execution of said related test groups for each of said selected time intervals;

identifying specific time function manipulation modules within said related test groups for which a time calculation error occurred; and recommending a particular action to be taken in response to an identified time calculation error.

8. In a computer system that has a plurality of computer program modules that perform time-based operations in a computer system, a method for determining whether time operations within a computer system function properly comprising the steps of:

identifing a time period to be evaluated;

dividing said time period into a plurality of time intervals;

accepting a first frequency value from a plurality of frequency values to specify the frequency at which time-based test modules are to execute the time-based operations of said computer system; and executing a first set of time-based test modules at the frequency specified by said first frequency value in a first time interval.

9. The method of claim 8 further comprising the step of accepting a second frequency value of said plurality of said frequency values and executing said time-based test modules at the frequency specified by second frequency value.

10. The method of claim 9 wherein said step of executing said time-based test modules at the frequency specified by the second frequency value is executed in second time interval.

11. A method for reporting the results of a test procedure that determines when time-based operations of a computer system fail comprising the steps of:

determining the number of failures of time-based operations of a computer system;

identifying a plurality of time intervals over which said failures occurred;

providing a value representative of selected ones of said time intervals;

associating a first symbol indicative of a first number of failures with the time interval in which the first number of failures occurred; and associating a second symbol indicative of a second number of failures with the time interval in which the second number of failures occurred.

12. The method of claim 11 wherein said first number is specified by a range of values from one to a first upper limit.

13. The method of claim 12 wherein said second number is specified by a range of values that exceed said first upper limit.

14. The method of claim 11 further comprising the step of:

associating a third symbol indicative of no failures occurring with the time interval in which failures occurred.

15. In a computer system that has a plurality of computer program modules that perform time-based operations in a computer system, a method for identifing time-based failures determined in a computer system comprising the steps of:

executing a first group of test procedures that determine whether a first set of time-based operations within the computer system execute without failure;

executing a second group of test procedures that determine whether a second set of time-based operations within the computer system execute without failure;

associating a first number with said first group of test procedures;

associating a second number with said second group of test procedures;

providing a set of failure code components for associating with the number of failures identified by said first and second test procedures;

displaying the number of failures for said first group of test procedures in association with said first number and selected ones of said failure code components, said association of said first number and selected ones of said failure code components identifying an failure code that defines the type of failures detected; and displaying the number of failures for said second group of test procedures in association with said second number and selected ones of said failure code components, said association of said second number and selected ones of said failure code components identifying a failure code that defines the type of failures detected.

16. The method of claim 15 wherein said first and second numbers are presented on different rows of a chart indicating the number of failures and wherein said failure code components are presented in different columns of said chart.

17. In a computer system that has a plurality of computer program modules that perform time-based operations in a computer system, a method for determining whether time operations within a computer system function properly comprising the steps of:

identifying a plurality of different time function modules in a computer system;

selecting a plurality of different groups of said time function modules for execution;

identifying a time period to be evaluated;

dividing said time period into a plurality of time intervals;

executing each of said plurality of groups for a plurality of time values that span each of said intervals;

determining whether time-based failures occur during execution of said plurality of groups for each of said time intervals; and identifying the types of failures that are determined for each of said time intervals.

* * * * *

UNITED STATES PATENT AND TRADEMARK OFFICE
CERTIFICATE OF CORRECTION

PATENT NO. : 5,974,569
DATED : October 26, 1999
INVENTOR(S) : Alfred E. Nickles

It is certified that error appears in the above-identified patent and that said Letters Patent is hereby corrected as shown below:

Title page, item [56] insert the following --

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 9 | 3 | 1 | 7 | 8 | 3/9/1993 | Chillarege et al. | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| 2 | 2 | 3 | 1 | 2 | 0 | 6 | 0 | 10/15/1997 | Great Britain | | | | |

OTHER DOCUMENTS (Including Author, Title, Date, Pertinent Pages, Etc.)

IBM - The Year 2000 and 2-Digit Dates: A Guide for Planning and Implementation, "Eighth Edition" - September 1997.

--.

Signed and Sealed this

Eleventh Day of July, 2000

Attest:

Q. TODD DICKINSON

*Attesting Officer*   *Director of Patents and Trademarks*